(12) United States Patent
Yasui et al.

(10) Patent No.: US 7,437,233 B2
(45) Date of Patent: Oct. 14, 2008

(54) IGNITION TIMING CONTROLLING DEVICE AND METHOD

(75) Inventors: Yuji Yasui, Saitama (JP); Yoshio Maeda, Saitama (JP); Masahiro Sato, Saitama (JP); Keiichi Nagashima, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 4 days.

(21) Appl. No.: 10/576,287

(22) PCT Filed: Nov. 5, 2004

(86) PCT No.: PCT/JP2004/016787

§ 371 (c)(1),
(2), (4) Date: Apr. 5, 2007

(87) PCT Pub. No.: WO2005/047692

PCT Pub. Date: May 26, 2005

(65) Prior Publication Data

US 2007/0271025 A1    Nov. 22, 2007

(30) Foreign Application Priority Data

Nov. 14, 2003 (JP) ............................. 2003-385741

(51) Int. Cl.
*G06G 7/70* (2006.01)

(52) U.S. Cl. ................... 701/102; 701/105; 123/406.12

(58) Field of Classification Search ................ 701/102, 701/105, 106; 123/406.12, 406.17, 406.22, 123/406.26, 406.27, 406.28
See application file for complete search history.

(56) References Cited

U.S. PATENT DOCUMENTS

| 5,740,045 | A | * | 4/1998 | Livshiz et al. ............... 701/101 |
| 6,980,903 | B2 | * | 12/2005 | Daniels et al. .............. 701/108 |
| 7,013,871 | B2 | * | 3/2006 | Zhu et al. .............. 123/406.21 |
| 7,021,287 | B2 | * | 4/2006 | Zhu et al. .................... 123/435 |
| 7,121,260 | B2 | * | 10/2006 | Miyanoo et al. ....... 123/406.26 |

FOREIGN PATENT DOCUMENTS

| JP | 4-066752 A | 3/1992 |
| JP | 8-20339 A | 3/1996 |
| JP | 8-128378 A | 5/1996 |
| JP | 2001-271699 A | 10/2001 |
| JP | 2003-262177 A | 9/2003 |

* cited by examiner

*Primary Examiner*—Willis R. Wolfe, Jr.
*Assistant Examiner*—Johnny H. Hoang
(74) *Attorney, Agent, or Firm*—Arent Fox LLP

(57) ABSTRACT

A method of controlling ignition timing of an engine. In the control method, final ignition timing for performing ignition is calculated by adding a variation component to a set ignition timing. According to the final ignition timing, an indicated average effective pressure of an in-cylinder pressure detected when ignition is performed is calculated. An ignition timing characteristic curve indicating the correlation between the indicated average effective pressure and the variation component is estimated and optimal ignition timing is calculated from the characteristic curve. Feedback control for converging the set ignition timing to the optimal ignition timing is then performed. Consequently, the ignition timing is controlled to an optimal ignition timing corresponding to a current operational state of the engine.

14 Claims, 16 Drawing Sheets

IGNITION TIMING CONTROLLING DEVICE AND METHOD

BACKGROUND OF THE INVENTION

The present invention relates to an apparatus and method for controlling an ignition timing of an internal combustion engine.

A method for detecting a pressure within the combustion chamber (hereinafter referred to as in-cylinder pressure) of the internal combustion engine (hereinafter referred to as an engine) to control an ignition timing has been proposed. According to a method shown in Japanese Patent Application Unexamined Publication (Kokai) No. 2003-262177, a difference $\Delta P$ between the in-cylinder pressure Ptdc at the top dead center (TDC) and the maximum in-cylinder pressure Pmax is compared with a threshold value. If the difference $\Delta P$ is less than the threshold value, the ignition timing is advanced.

It is preferable that ignition is performed at an optimum ignition timing. The optimum ignition timing is typically called MBT (Minimum advance for the Best Torque). Ignition at the optimum ignition timing improves the combustion efficiency and the purification performance of exhaust gas.

In general, ignition timings corresponding to various operating conditions of the engine are stored in a memory as a map. The map is referred to based on the detected operating condition of the engine to determine the ignition timing corresponding to the detected operating condition. In a vehicle comprising mechanisms such as a valve timing mechanism and a variable compression ratio mechanism, the number of possible operating conditions of the engine is large, and hence the number of ignition timings to be stored in a map is large. Defining such a large number of ignition timings in a map may be difficult.

Since a recent vehicle comprises various parts associated with the engine, variations may occur in the combustion condition and deterioration over time may vary from part to part. Thus, it may be difficult to establish ignition timings adapted to various parts.

If the optimum ignition timing MBT corresponding to the current operating condition of the engine cannot be determined, the ignition timing needs to be retarded so as to avoid knocking. Control for retarding the ignition timing may reduce the combustion efficiency.

According to the above prior art, the ignition timing is gradually moved to the optimum ignition timing while comparing between the in-cylinder pressure and a threshold value periodically. Since this scheme takes time to cause the ignition timing to converge to the optimum ignition timing, the combustion efficiency may reduce.

Thus, there is a need for an apparatus and a method for estimating the optimum ignition timing MBT corresponding to the current operating condition of the engine and then causing the ignition timing to quickly converge to the estimated optimum ignition timing.

SUMMARY OF THE INVENTION

According to one aspect of the invention, an apparatus for controlling an ignition timing of an engine is provided. The apparatus comprises an ignition timing calculator for adding a fluctuating component to a set ignition timing to calculate a final ignition timing for igniting the engine, a mean effective pressure calculator for calculating an indicated mean effective pressure for an in-cylinder pressure detected when the engine has been ignited according to the final ignition timing, an MBT calculator for estimating an ignition timing characteristic curve that represents a correlation between the indicated mean effective pressure and the fluctuating component and for determining an optimum ignition timing from the characteristic curve, and a controller for controlling the set ignition timing to converge to the optimum ignition timing.

According to the invention, by adding the fluctuating component to the ignition timing, the optimum ignition timing corresponding to the current operating condition of the engine can be determined. Convergence of the ignition timing to the optimum ignition timing increases the in-cylinder pressure and prevents the combustion efficiency from reducing. Since the optimum ignition timing corresponding to the current operating condition can be determined, it is not required to store a large number of ignition timings in a memory in advance.

According to one embodiment of the invention, the ignition timing characteristic curve is represented by a function. An input of the function is the fluctuating component and an output of the function is the indicated mean effective pressure. The MBT calculator further includes an identifier for identifying coefficients associated with the fluctuating component in the function based on the indicated mean effective pressure calculated by the mean effective pressure calculator. The characteristic curve is estimated based on the identification of the coefficients. Thus, the coefficients included in the function are more correctly identified, thereby improving the accuracy of estimating the characteristic curve.

According to one embodiment of the invention, the apparatus further comprises a generator for generating the fluctuating component. The generator generates the fluctuating component to meet self-excitation conditions for identifying the coefficients of the function. In one example, the number of self-excitation conditions is equal to or greater than a value obtained by adding one to the number of the coefficients to be identified. Thus, a signal for estimating the characteristic curve is appropriately generated.

According to one embodiment of the invention, the identifier is further configured to determine update components for the coefficients so that an error between the indicated mean effective pressure calculated by the mean effective pressure calculator and an estimated indicated mean effective pressure estimated from the function converges to zero, add the update components to predetermined reference values to determine the coefficients. The coefficients converge to the reference values as the error converges to zero. The reference values are predetermined so that the control for controlling the set ignition timing to converge to the optimum ignition timing stops when the coefficients have converged to the reference value.

According to the invention, when an actual mean effective pressure is equal to the indicated mean effective pressure estimated from the characteristic curve (that is, when the identification error approaches almost zero), the coefficients converge to the reference values, thereby preventing drift of the coefficients. Further, since the reference values are established so that the feedback control for the ignition timing stops when the coefficients have converged to the reference values, it is prevented that an erroneous identification continues.

According to one embodiment of the invention, a limit process is applied to at least one of the coefficients so that it is prevented that the characteristic curve is estimated as a downward convex curve.

When the set ignition timing has converged to the neighborhood of the optimum ignition timing, the curvature of the estimated characteristic curve is flat. According to the invention, it is prevented in such a state that the curvature of the characteristic curve is erroneously estimated.

According to one embodiment of the invention, the mean effective pressure calculator is configured to extract an alternating component from the detected in-cylinder pressure and to calculate the indicated mean effective pressure based on the alternating component. Thus, even if influence caused by pyroelectric effect and thermal drift appears in the output of the in-cylinder pressure sensor, such influence is removed from the determination of the indicated mean effective pressure. Therefore, a ceramic-type piezoelectric element can be used for the in-cylinder pressure sensor. Further, the in-cylinder pressure sensor can be placed near the wall of the engine cylinder.

According to one embodiment of the invention, the controller uses a response assignment control to control the set ignition timing. The response assignment control is capable of specifying the response characteristic of the set ignition timing to the optimum ignition timing. Thus, the set ignition timing converges to the optimum ignition timing without overshooting. The combustion efficiency is prevented from reducing because the ignition timing is not required to be excessively retarded or advanced.

DESCRIPTION OF THE PREFERRED EMBODIMENTS

Structure of Engine and Control Unit

Figure 1:
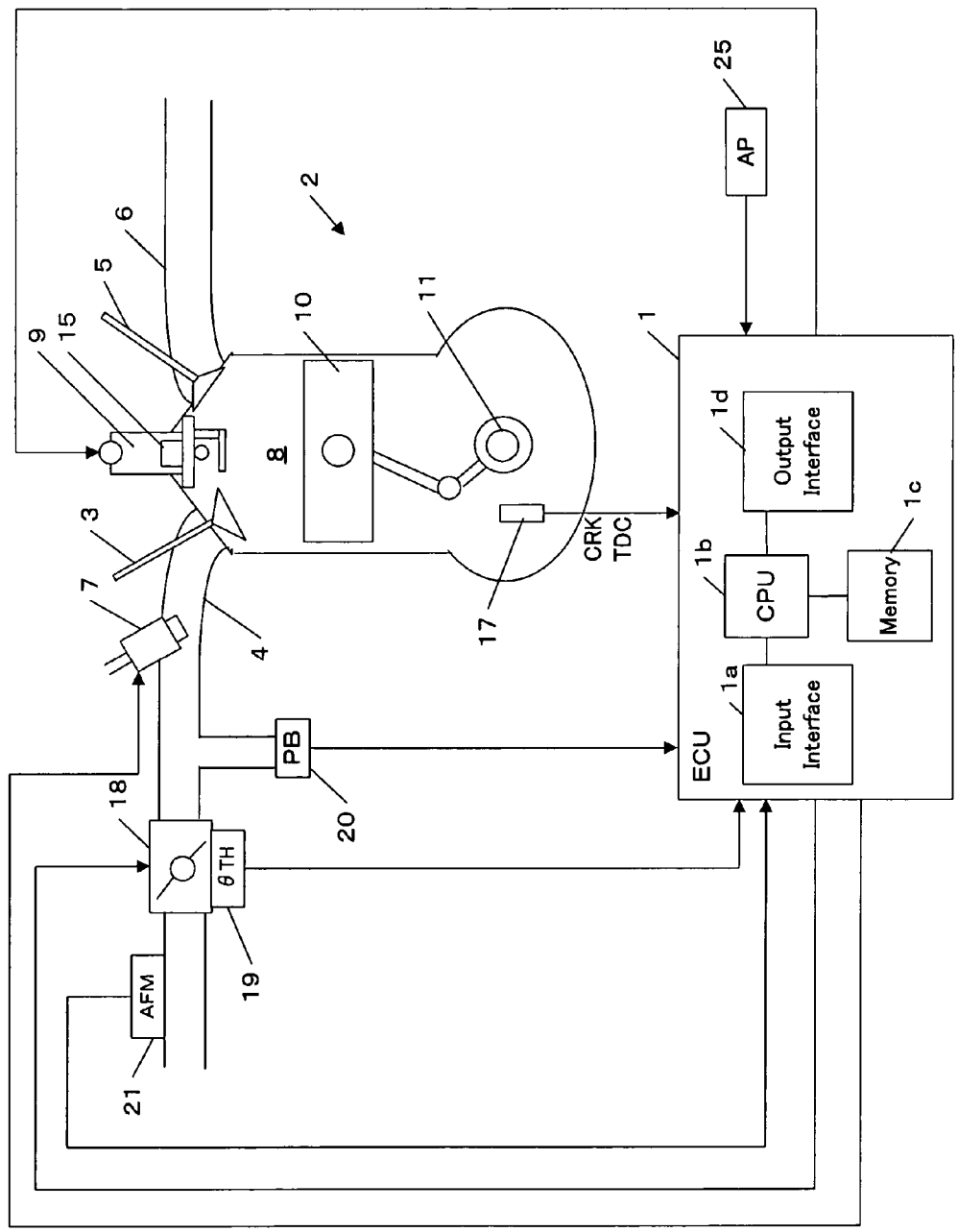
FIG. 1 is a block diagram showing an engine and its control unit in accordance with one embodiment of the present invention.

Referring to the drawings, specific embodiments of the invention will be described. FIG. 1 is a block diagram showing an engine and a control unit for the engine in accordance with one embodiment of the invention.

An electronic control unit (hereinafter referred to as an ECU) 1 comprises an input interface 1$a$ for receiving data sent from each part of the vehicle, a CPU 1$b$ for carrying out operations for controlling various parts of the vehicle, a memory 1$c$ including a read only memory (ROM) and a random access memory (RAM), and an output interface 1$d$ for sending a control signal to various parts of the vehicle. Programs and various data for controlling each part of the vehicle are stored in the ROM. A program and data for implementing an ignition timing control in accordance with the invention are stored in the ROM. The ROM may be a rewritable ROM such as an EPROM. The RAM provides work areas for operations by the CPU 1$b$, in which data sent from each part of the vehicle as well as control signals to be sent out to each part of the vehicle are temporarily stored.

An engine 2 is, for example, a 4-cycle engine. The engine 2 is connected to an intake manifold 4 through an intake valve 3 and connected to an exhaust manifold 6 through an exhaust valve 5. A fuel injection valve 7 is provided, for each cylinder, in the intake manifold 4. The fuel injection valve 7 injects fuel in accordance with a control signal from the ECU 1.

The engine 2 introduces into a combustion chamber 8 a mixture of intake air from the intake manifold 4 and fuel injected from the fuel injection valve 7. A spark plug 9 for generating a spark in accordance with an ignition timing signal from the ECU 1 is provided in the combustion chamber 8. The spark from the spark plug 9 causes the combustion of the mixture. The combustion increases the volume of the mixture, thereby pushing the piston 10 down. The reciprocal motion of the piston 10 is converted into the rotational motion of the crank shaft 11.

An in-cylinder pressure sensor 15 is, for example, a sensor comprising a piezoelectric element. The in-cylinder pressure sensor 15 is embedded in the connecting portion between the cylinder and the spark plug. The in-cylinder pressure sensor 15 produces an in-cylinder signal Pcyl corresponding to the pressure within the combustion chamber 8. The in-cylinder signal is sent to the ECU 1.

A crank angle sensor 17 is disposed in the engine 2. The crank angle sensor 17 outputs a CRK signal and a TDC signal to the ECU 1 in accordance with the rotation of the crankshaft 11.

The CRK signal is a pulse signal that is output at every predetermined crank angle (for example, 15 degrees). The ECU 1 calculates a rotational speed NE of the engine 2 in accordance with the CRK signal. The TDC signal is also a pulse signal that is output at a crank angle associated with a TDC (top dead center) position of the piston 10.

A throttle valve 18 is disposed in an intake manifold 4 of the engine 2. An opening degree of the throttle valve 18 is controlled by a control signal from the ECU 1. A throttle valve opening sensor (θTH) 19, which is connected to the throttle valve 18, supplies the ECU 1 with an electric signal corresponding to the opening angle of the throttle valve 18.

An intake manifold pressure (Pb) sensor 20 is disposed downstream of the throttle valve 18. The intake manifold pressure Pb detected by the Pb sensor 20 is sent to the ECU 1.

An airflow meter (AFM) 21 is disposed upstream of the throttle valve 18. The airflow meter 21 detects the amount of air passing through the throttle valve 18 and sends it to the ECU 1.

An accelerator opening sensor 25 is connected to the ECU 1. The accelerator opening sensor 25 detects an opening degree of the accelerator pedal and sends it to the ECU 1.

A mechanism (not shown) for variably driving a phase and/or lift amount of the intake valve and/or the exhaust valve may be provided. A mechanism (not shown) for changing a compression ratio of the combustion chamber may be provided.

Signals sent to the ECU 1 are passed to the input interface 1a. The input interface 5a converts analog signal values into digital signal values. The CPU 1b processes the resulting digital signals, performs operations in accordance with one or more programs stored in the memory 1c, and creates control signals. The output interface 1d sends these control signals to actuators for the fuel injection valve 7, spark plug 9, throttle valve 18 and other mechanical components.

General Principle of the Invention

For the sake of easier understanding of the invention, the general principle of the invention will be described first.

Figure 2:
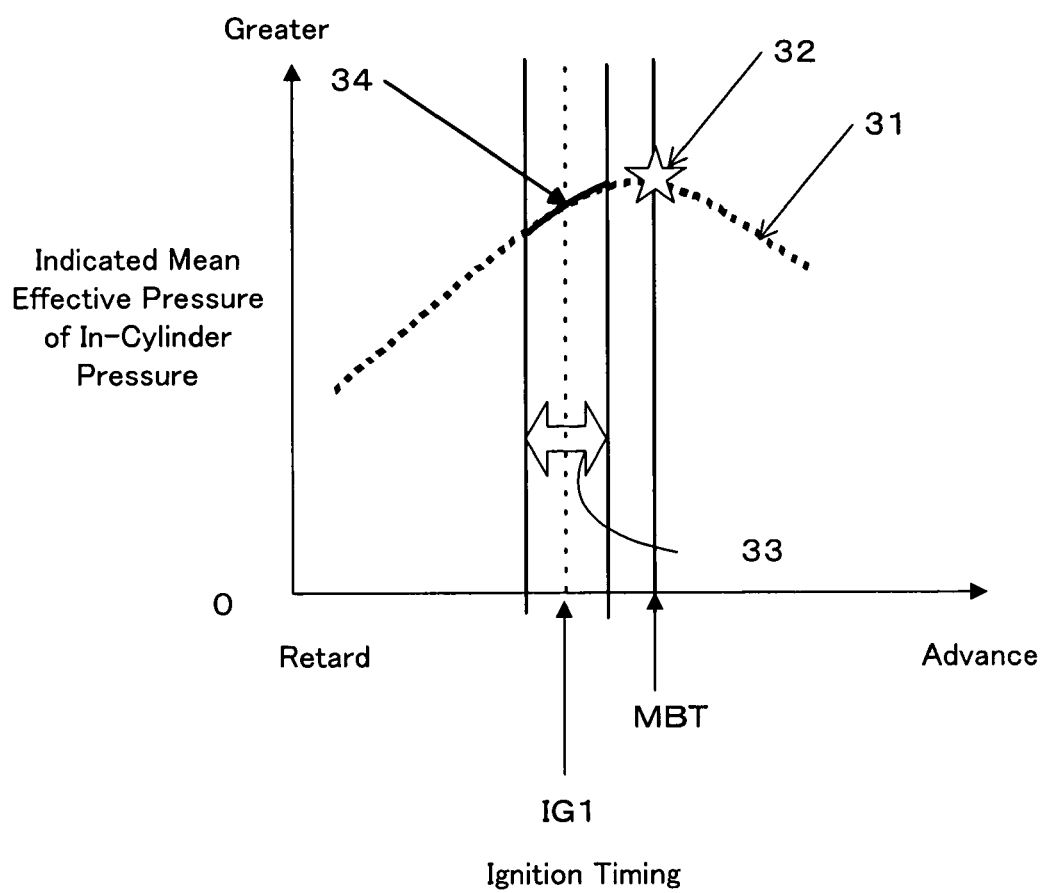
FIG. 2 is a diagram for explaining a general principle of an ignition timing control in accordance with one embodiment of the present invention.

Referring to FIG. 2, the vertical axis indicates an indicated mean effective pressure of the in-cylinder pressure. The horizontal axis indicates the ignition timing. The characteristic curve 31 indicates a correlation between the indicated mean effective pressure and the ignition timing. A method for calculating the indicated mean effective pressure will be described later. As shown in the figure, the characteristic curve 31 has a maximum value 32. The ignition timing corresponding to the maximum value 32 is called an optimum ignition timing MBT.

It is assumed that the currently set ignition timing is IG1. According to one embodiment of the invention, a fluctuating component is added to the ignition timing IG1. Such addition of the fluctuating component causes the ignition timing to fluctuate within a predetermined range. In one embodiment, as shown by arrow 33, the fluctuating component is determined so that the ignition timing fluctuates between plus and minus with respect to IG1 over continuous cycles.

Thus, the indicated mean effective pressure when the ignition timing is fluctuated is acquired. The portion 34 (solid line) on the characteristic curve 31 corresponding to the range 33 is acquired based on the fluctuating component and the acquired indicated mean effective pressure. A form of the characteristic curve 31 is estimated from the portion 34. The optimum ignition timing MBT is determined from the estimated characteristic curve 31. The ignition timing is controlled to converge to the optimum ignition timing MBT.

According to the invention, since the optimum ignition timing MBT according to the current operating condition of the engine is determined, the ignition timing can quickly converge to the optimum ignition timing MBT. By causing the ignition timing to quickly converge to the optimum ignition timing MBT, the in-cylinder pressure is maximized and the combustion efficiency is prevented from reducing. Furthermore, according to the invention, it is not required that a large number of ignition timings corresponding to various operating conditions of the engine and various parts associated with the engine are stored in a memory in advance.

Ignition Timing Control Apparatus

Figure 3:
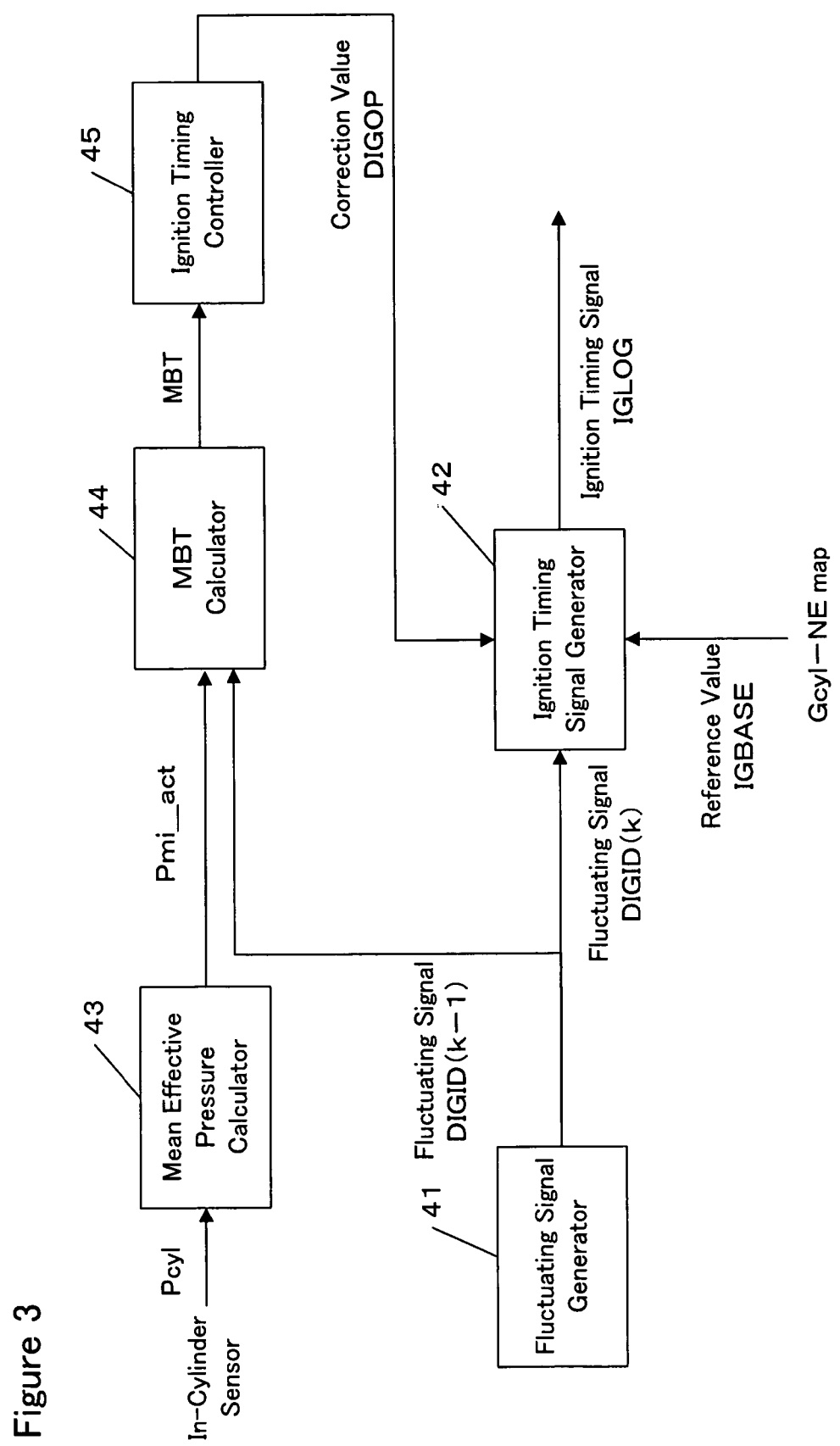
FIG. 3 is a block diagram showing an ignition timing control apparatus in accordance with one embodiment of the present invention.

FIG. 3 shows a block diagram of an ignition timing control apparatus in accordance with one embodiment of the present invention. Functions of each block are typically implemented by one or more programs stored in the memory 1c. Alternatively, these functions may be implemented by any kind of hardware.

A fluctuating signal generator 41 generates a fluctuating signal DIGID. The fluctuating signal DIGID indicates the fluctuating component as described above referring to FIG. 2. The fluctuating signal DIGID is passed to an ignition timing signal generator 42. In one embodiment, the value of the fluctuating signal DIGID may be stored in advance in the memory 1c.

Figure 4:
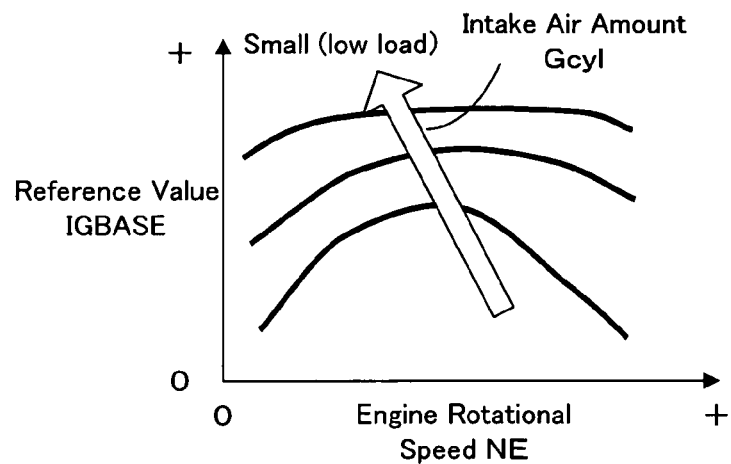
FIG. 4 shows a map for specifying a reference value of the ignition timing in accordance with one embodiment of the present invention.

The ignition timing signal generator 42 refers to a map based on the detected current operating condition of the engine to determine a reference value IGBASE for the ignition timing. In this embodiment, the reference value IGBASE is determined by referring to a map based on the detected intake air amount Gcyl and the detected engine rotational speed NE. FIG. 4 shows an example of such a map, which may be stored in the memory 1c of FIG. 1.

Preferably, the map specifies ignition timings only for typical operating conditions of the engine. Ignition timings for a large number of operating conditions are not required in the map. It should be noted that such a map is not necessarily required, as described later. However, if such a map is available, a convergence speed to the optimum ignition timing MBT can be improved.

The intake air amount Gcyl is calculated in accordance with the equation (1). In the equation, Gth represents a value detected by the airflow meter 21 (FIG. 1). Pb represents a value detected by the intake manifold pressure sensor 20 (FIG. 1). Vb represents a volume ($m^3$) of the intake manifold. Tb represents a temperature (K) of the intake manifold. R represents the gas constant. "k" is used for identifying a control cycle. (k) indicates the current control cycle and (k−1) indicates the previous control cycle.

In the following description, processes in a control cycle represented by "k" are performed in synchronization with a combustion cycle (for example, the combustion cycle for a four-cycle engine is from 0 to 720 crank angle degrees).

$$Gcyl(k) = Gth(k) - \frac{(Pb(k) - Pb(k-1)) \cdot Vb}{Tb \cdot R} \tag{1}$$

The ignition timing signal generator 42 calculates an ignition timing signal IGLOG by adding the fluctuating signal DIGID received from the fluctuating signal generator 41 to a sum of the reference value IGBASE and a correction value DIGOP, as shown in the equation (2). The spark plug 9 (FIG. 1) is driven in accordance with the ignition timing signal IGLOG.

$$IGLOG = IGBASE + DIGOP + DIGID \quad (2)$$

The correction value DIGOP is used for causing the ignition timing to converge to the optimum ignition timing MBT. It should be noted that the fluctuating signal DIGID is included in the ignition timing signal IGLOG. By intentionally including such a fluctuating signal DIGID in the ignition timing signal IGLOG, (IGBASE+DIGOP) is caused to fluctuate within a predetermined range.

In the following description, (IGBASE+DIGOP) may be referred to as a set ignition timing. The set ignition timing is based on the current operating condition of the engine and is an object controlled by a control for causing the ignition timing to converge to the optimum ignition timing. As described above referring to FIG. 2, the fluctuating signal DIGID is added so that the ignition timing fluctuates within a predetermined range relative to the set ignition timing. It is preferable that the fluctuating signal DIGID is generated so that the fluctuating signal thus generated does not cause a large variation in the combustion condition.

When the engine has been ignited in accordance with the ignition timing signal IGLOG including the fluctuating signal DIGID, the in-cylinder pressure Pcyle is detected by the in-cylinder pressure sensor 15. A mean effective pressure calculator 43 calculates an indicated mean effective pressure Pmi_act based on the detected in-cylinder pressure Pcyl.

An MBT calculator 44 estimates a characteristic curve of the ignition timing based on the indicated mean effective pressure Pmi_act and the fluctuating signal DIGID corresponding to the indicated mean effective pressure Pmi_act. The optimum ignition timing MBT is calculated from the estimated characteristic curve.

An ignition timing controller 45 calculates the above-described correction value DIGOP so that the set ignition timing converges to the optimum ignition timing MBT.

In this embodiment, a sum of the reference value IGBASE and the correction value DIGOP is controlled to converge to the MBT. Using the reference value has the following advantage. The operating condition of the engine may abruptly change. If the reference value corresponding to the operating condition detected after such a change is used, the controller 45 can cause the ignition timing to more quickly converge to the optimum ignition timing MBT. However, alternatively, the controller 45 may be configured to calculate the ignition timing in each control cycle so as to cause the ignition timing to converge to the optimum ignition timing without using such a reference value.

Mean Effective Pressure Calculator

Figure 5:
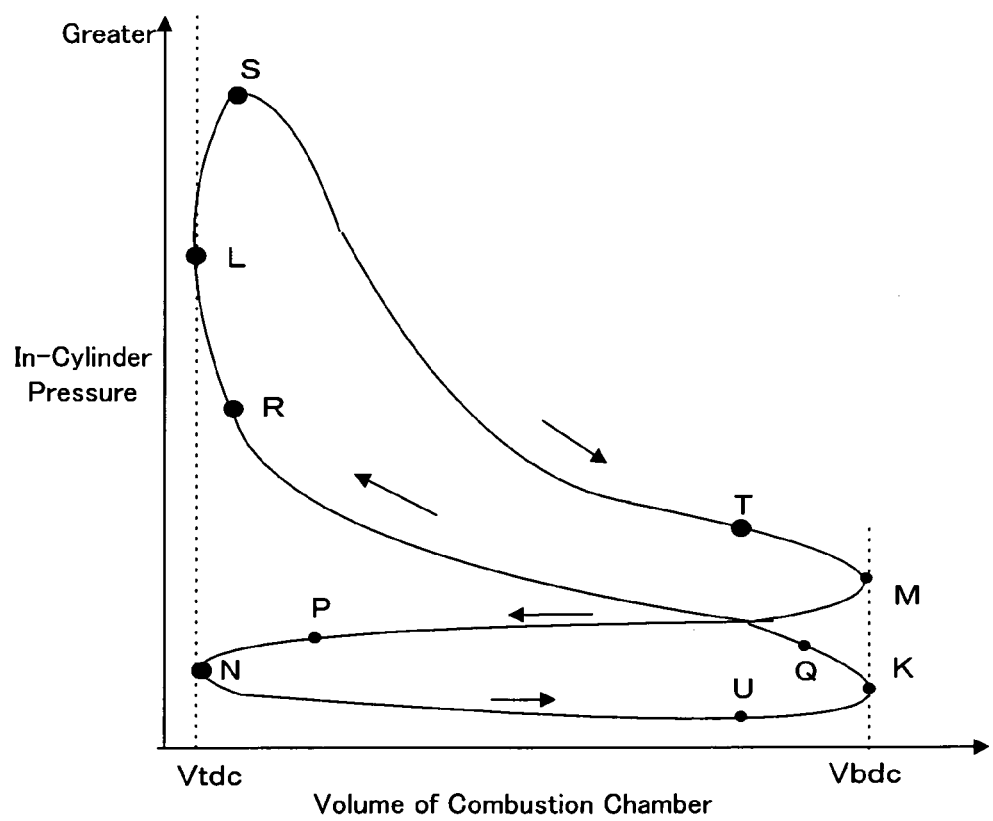
FIG. 5 shows a relationship between a volume and an in-cylinder pressure of a combustion chamber.

Referring to FIG. 5, the indicated mean effective pressure will be described. FIG. 5 shows a relationship between a volume of the combustion chamber of the engine and an in-cylinder pressure of the combustion chamber of the engine. At a point P, the intake valve is opened to start an intake stroke. The in-cylinder pressure decreases to a point U where the pressure is minimum through a point N that corresponds to the top dead center TDC of the piston. Then, the in-cylinder pressure increases through a point K that corresponds to the bottom dead center BDC. A compression stroke starts at a point Q. The in-cylinder pressure increases during the compression stroke. At a point R, a combustion stroke starts and the in-cylinder pressure abruptly increases due to the combustion of air-fuel mixture. At a point S, the in-cylinder pressure is maximum. The piston is pushed down due to the combustion of the air-fuel mixture. The piston moves to BDC shown by a point M. The in-cylinder pressure decreases according to this movement. At a point T, the exhaust valve is opened to start an exhaust stroke. The in-cylinder pressure further decreases during the exhaust stroke.

A value obtained by dividing the area surrounded by the in-cylinder pressure curve as illustrated in FIG. 5 by the piston stroke volume is referred to as an indicated mean effective pressure.

In an alternative embodiment, the mean effective pressure from the point K corresponding to BDC to the point M corresponding to BDC through the point L corresponding to TDC may be calculated as an indicated mean effective pressure.

In one embodiment of the present invention, the mean effective pressure calculator 43 samples the detection value of the in-cylinder pressure sensor at every predetermined crank angle (15 degrees in this embodiment). A sampled in-cylinder pressure is represented by Pcyl(n). "n" indicates a sampling cycle.

The mean effective pressure calculator 43 calculates an indicated mean effective pressure Pmi_act according to the equation (3). The equation shows a method for calculating the indicated mean effective pressure Pmi_act by extracting only alternating components from the in-cylinder pressure. The detail of this method is shown in Japanese Patent Application Examined Publication (Kokoku) No. H08-20339.

In the equation (3), "h" is a coefficient according to the number of strokes required for one combustion cycle. In the case of a four-cycle engine, h=½ and in the case of a two-cycle engine, h=1. "λ" is a ratio of a length "s" of the connecting rod to a radius "r" of the crankshaft. That is, λ=s/r.

C1 represents an amplitude of a first-order component of the engine rotational speed (that is, an amplitude of a frequency component corresponding to the engine rotational speed) in the in-cylinder pressure Pcyl. φ1 represents a phase error with respect to TDC of the first-order component of the engine rotational speed in the in-cylinder pressure Pcyl. C2 represents an amplitude of a second-order component of the engine rotational speed (that is, an amplitude of a frequency component corresponding to twice the engine rotational speed) in the in-cylinder pressure Pcyl. φ2 represents a phase error with respect to TDC of the second-order component of the engine rotational speed in the in-cylinder pressure Pcyl. As described above, k represents a control cycle in synchronization with the combustion cycle. The calculation of the indicated mean effective pressure Pmi_act is performed in each combustion cycle.

$$\text{Pmi\_act}(k) = \frac{\pi}{2h}\left(C1(k)\cos(\phi1(k)) + \frac{1}{2\lambda}C2(k)\cos(\phi2(k))\right) \quad (3)$$

Thus, the mean effective pressure calculator 43 calculates the indicated mean effective pressure Pmi_act based on the alternating components (the first-order component and the second-order component in this embodiment) of the in-cylinder pressure Pcyl.

A method for extracting the first-order component and the second-order component from the in-cylinder pressure Pcyl will be described. It should be noted that this extracting method is different from that of the above-referenced Japanese Patent Application Examined Publication (Kokoku) No. H08-20339. The method shown in this publication extracts the components by using analog filters. In contrast, the method according to one embodiment of the present invention extracts the components by using digital filters.

The mean effective pressure calculator 43 applies a first-order filter and a second-order filter to the sampled in-cylinder pressure Pcyl(n) as shown in the equations (4) and (5), respectively. As described above, "n" indicates a sampling cycle that is synchronized with predetermined crank angle (for example, 15 degrees).

$$Pcylod1(n) = aod11 \cdot Pcylod1(n-1) + aod12 \cdot Pcylod1(n-2) + \qquad (4)$$
$$aod13 \cdot Pcylod1(n-3) + aod14 \cdot Pcylod1(n-4) +$$
$$bod10 \cdot Pcyl(n) + bod11 \cdot Pcyl(n-1) + bod12 \cdot$$
$$Pcyl(n-2) + bod13 \cdot Pcyl(n-3) + bod14 \cdot$$
$$Pcyl(n-4) \text{ filter coefficients} aod1i(i=1\sim4),$$
$$bod1j(j=0\sim5)$$

$$Pcylod2(n) = aod21 \cdot Pcylod1(n-1) + aod22 \cdot Pcylod1(n-2) + \qquad (5)$$
$$aod23 \cdot Pcylod1(n-3) + aod24 \cdot Pcylod1(n-4) +$$
$$bod20 \cdot Pcyl(n) + bod21 \cdot Pcyl(n-1) + bod22 \cdot$$
$$Pcyl(n-2) + bod23 \cdot Pcyl(n-3) + bod24 \cdot$$
$$Pcyl(n-4) \text{ filter coefficients} aod2i(i=1\sim4)$$
$$bod2j(j=0\sim5)$$

Figure 6:
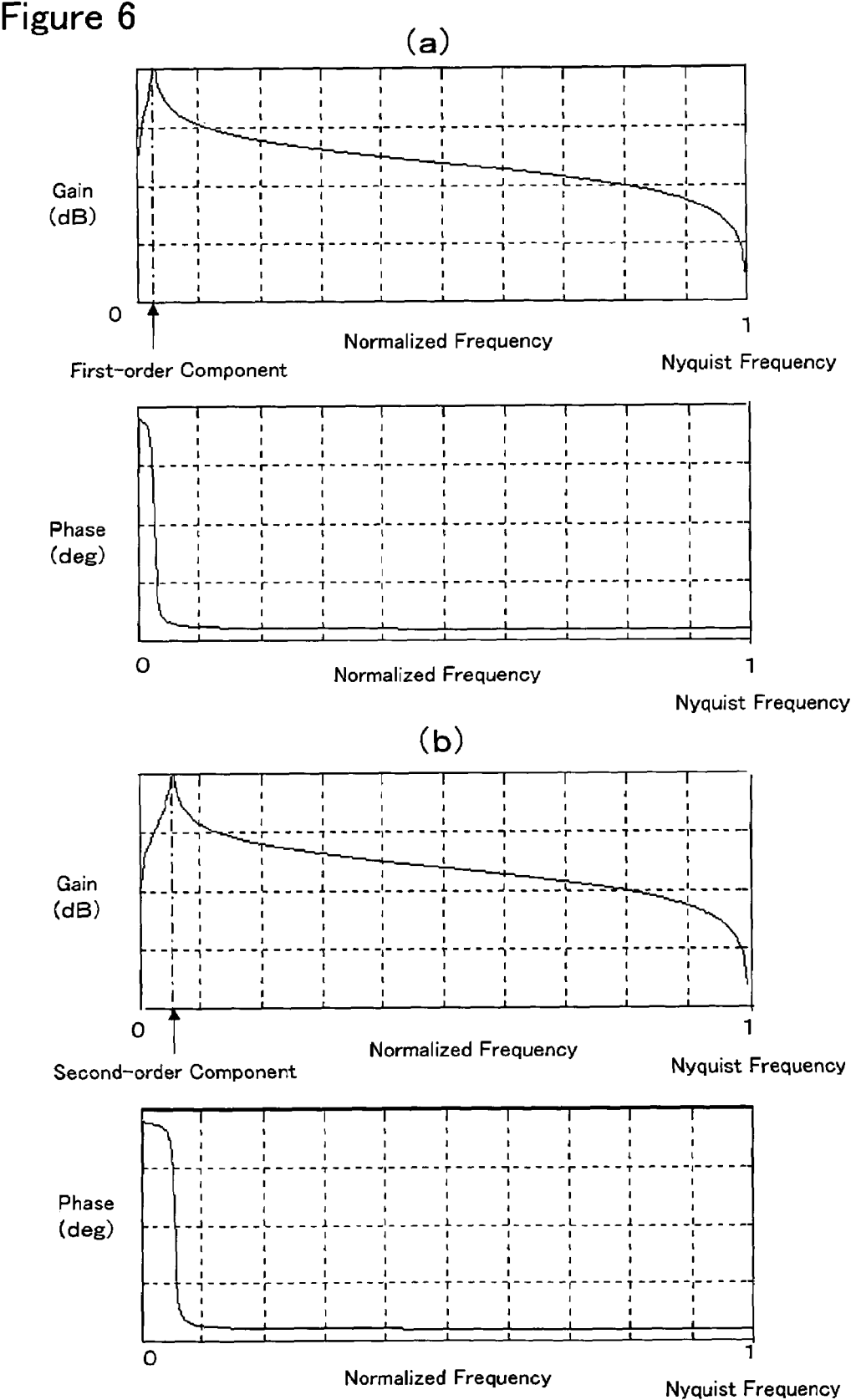
FIG. 6 shows characteristics of a first-order filter and a second-order filter in accordance with one embodiment of the present invention.

Characteristics of these digital filters are shown in FIGS. 6(a) and 6(b), respectively. The first-order filter (a) is a bandpass filter having a characteristic of extracting the first-order component of the engine rotational speed. The second-order filter (b) is a bandpass filter having a characteristic of extracting the second-order component of the engine rotational speed. A horizontal axis represents a frequency that is normalized by the Nyquist frequency.

The Nyquist frequency changes in accordance with the engine rotational speed because the in-cylinder pressure Pcyl is sampled in a cycle that is synchronized with the engine rotational speed. Such normalization by the Nyquist frequency enables the first-order-component and the second-order-component of the engine rotational speed to be extracted from the in-cylinder pressure Pcyl without changing the coefficients of these filters, regardless of the current value of the engine rotational speed.

According to a method for applying the filters at a constant time interval, the pass band may become an extremely low frequency when the engine rotational speed is low and hence the filter coefficients may become extremely small. This may make the outputs from the filters unstable. The above method according to one embodiment of the invention, such phenomenon can be avoided because the filters are applied in synchronization with the engine rotational speed.

An analog waveform representing Pcylod1(n) that is obtained by applying the first-order filter is expressed as C1·sin (θne+φ1). An analog waveform representing Pcylod2 (n) that is obtained by applying the second-order filter is expressed as C2·sin (2θne+φ2). Here, θne represents an engine rotation angle having a value of 0 to 2π. When the piston is positioned at TDC, θne=0rad.

C1·cos (φ1) and C2·cos (φ2) in the equation (3) can be expressed as shown in the equations (6) and (7), respectively.

$$C1\cos(\phi 1) = C1\sin\left(\frac{\pi}{2} + \phi 1\right) \qquad (6)$$

-continued
$$C2\cos(\phi 2) = C2\sin\left(\frac{\pi}{2} + \phi 2\right) = C2\sin\left(2\left(\frac{\pi}{4}\right) + \phi 2\right) \qquad (7)$$

As seen from the comparison between the first-order filter output C1·sin (θne+φ1) and the equation (6), the first-order component C1·cos (φ1) of the equation (3) can be obtained by sampling the output of the first-order filter when the engine rotation angle is π/2 (that is, when θne=π/2). Similarly, as seen from comparison between the second-order filter output C2·sin (2 θne+φ1) and the equation (7), the second-order component C2·cos (φ2) of the equation (3) can be obtained by sampling the output of the second-order filter when the engine rotation angle is π/4 (that is, when θne=π/4).

Figure 7:
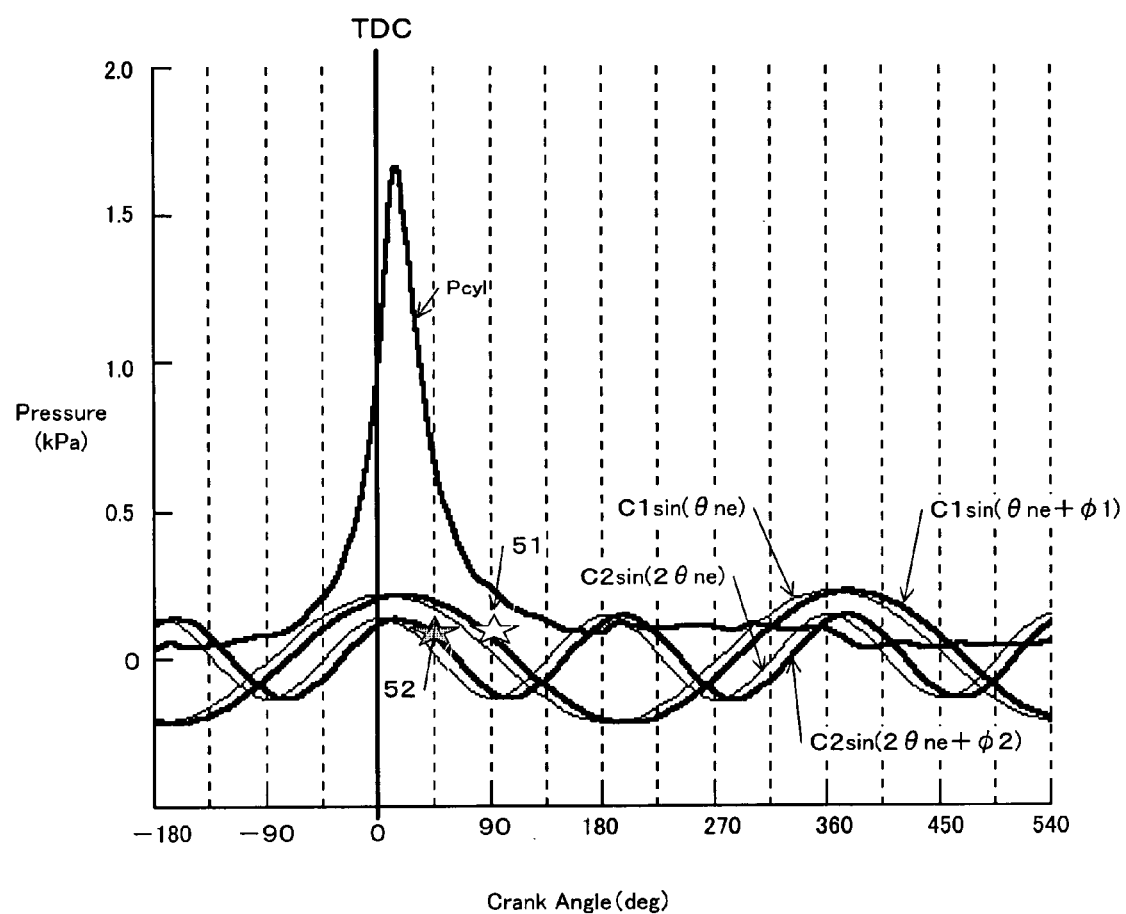
FIG. 7 is a diagram for explaining a method for extracting a first-order component and a second-order component from the in-cylinder pressure in accordance with one embodiment of the present invention.

Here, referring to FIG. 7, the in-cylinder pressure Pcyl, the analog waveform C1·sin (θne+φ1) of the first-order filter output and the analog waveform C2·sin (2θne+φ2) of the second-order filter output are shown. The horizontal axis indicates the crank angle. The analog waveform C1·sin (θne+ φ1) and the analog waveform C1·sin (θne+φ1) are shown by bold lines. For the comparison purpose, C1·sin (θne) and C2·sin (2·θne) are shown by thin lines.

As described above, a value 51 that is obtained by sampling the first-order filter output C1·sin (θne+φ1) when θne=π/2 (that is, sampling at 90 degrees after TDC) represents the first-order component C1·cos (φ1) of the equation (3). A value 52 that is obtained by sampling the second-order filter output C2·sin (2θne+φ2) when θne=π/4 (that is, sampling at 45 degrees after TDC) represents the second-order component C2·cos (φ2) of the equation (3).

Thus, by sampling and holding the first-order filter output and the second-order filter output at the predetermined crank angles, the indicated mean effective pressure Pmi_act can be calculated according to the equation (3).

Alternatively, the sampling cycle of the internal cylinder pressure may be set to an integral submultiple of 45 crank angle degrees (for example, sampling may be performed at every crank angle 5 degrees or 3 degrees) because it is sufficient if the digital filter outputs can be sampled at 45 and 90 degrees after TDC.

Figure 8:
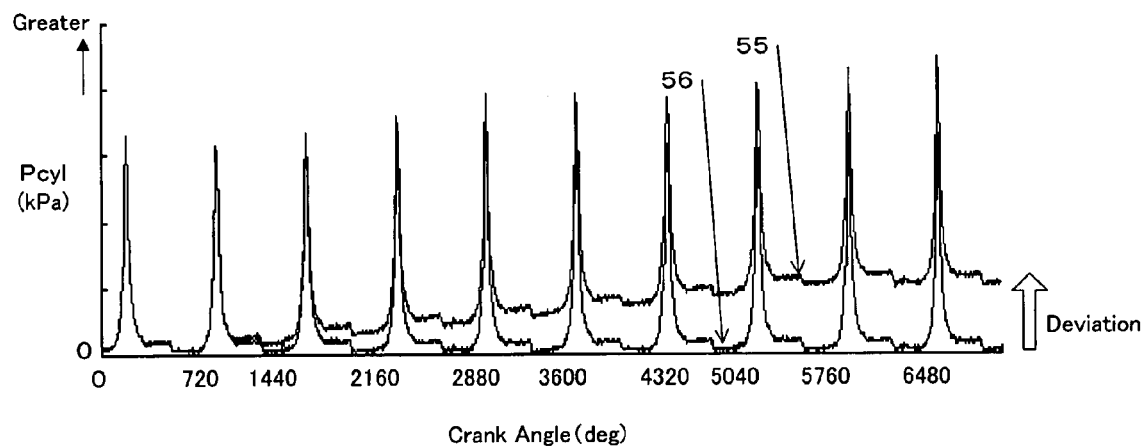
FIG. 8 is a diagram for explaining effect of calculating an indicated mean effective pressure based on an alternating component of the in-cylinder pressure in accordance with one embodiment of the present invention.
Figure 8:
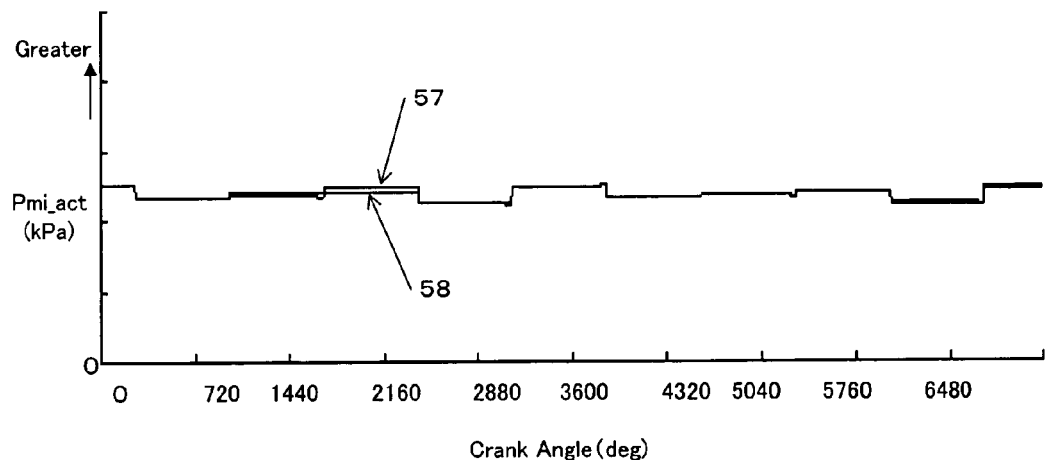

Referring to FIG. 8, the effect of the above-described method for calculating the indicated mean effective pressure by extracting only the alternating components from the in-cylinder pressure will be described. A waveform 55 shows the detection value of the on-board in-cylinder pressure sensor 15 as shown in FIG. 1 when the sensor is mounted on a vehicle. The waveform 56 shows the detection value of a sensor that is used for the experiment purpose.

The in-cylinder pressure sensor for experiment is provided to directly touch the air-fuel mixture inside the combustion chamber. A piezoelectric element provided in the in-cylinder pressure sensor for experiment is made of a single crystal, which is very expensive.

On the other hand, a piezoelectric element used for the on-board in-cylinder pressure sensor is usually made of polycrystalline ceramics from the viewpoint of cost and durability. Since the on-board sensor is mounted on a vehicle, it may be difficult to keep the temperature of the piezoelectric element at a constant level. Accordingly, as seen from the comparison with the waveform 56 representing the output of the sensor used for experiment, the waveform 55 for the on-board sensor has "deviation" in the detection value Pcyl that is caused by pyroelectric effect and heat drift.

In order to prevent such deviation, it is required that the piezoelectric element is made of expensive single crystal and that the sensor is positioned far from the combustion chamber so as to avoid the influence of the temperature within the combustion chamber caused by variations in the operating condition of the engine. However, such arrangement of the sensor is high cost. Further, the S/N ratio may decrease because the absolute value of the sensor output becomes small.

Frequency components that may appear due to pyroelectric effect and heat drift are slower than the first-order component. According to one embodiment of the present invention, such undesired frequency components can be removed because the indicated mean effective pressure Pmi_act is calculated based on the alternating components of the in-cylinder pressure. As shown in FIG. 8(b), the indicated mean effective pressure Pmi_act (shown by a waveform 57) that is calculated based on the detection value of the on-board in-cylinder pressure sensor 15 exhibits almost the same value as the indicated mean effective pressure (shown by a waveform 58) that is calculated based on the detection value of the sensor used for experiment.

Fluctuating Signal generator and MBT Calculator

Figure 9:
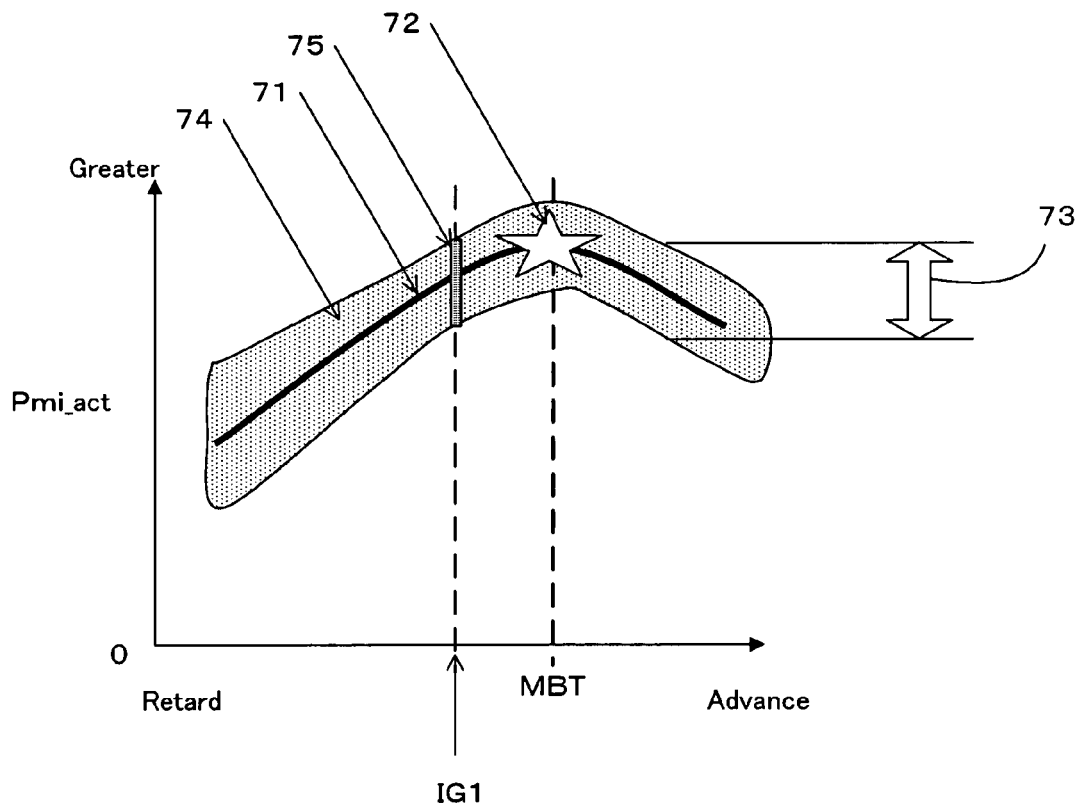
FIG. 9 shows a relationship between an ignition timing and an indicated mean effective pressure.

FIG. 9 shows a diagram similar to FIG. 2. A characteristic curve 71 of the ignition timing has a maximum value 72. The ignition timing corresponding to the maximum value 72 is the optimum ignition timing MBT.

Since actual combustion conditions vary in every combustion cycle, the indicated mean effective pressure Pmi_act is usually distributed within a range as shown by a shaded area 74 having a width 73.

In an environment for testing the engine, a characteristic curve 71 can be obtained by measuring the indicated mean effective pressure while changing the ignition timing from "retard" to "advance". However, performing such operation when the vehicle is actually traveling may cause degradation in drivability.

If the ignition timing is fixed to a value (IG1, for example) extracted from a map as in conventional schemes, the indicated mean effective pressure is distributed on a line 75. The form (the curvature and inclination) of the characteristic curve 71 cannot be estimated from such one-dimensional distribution of the indicated mean effective pressure.

In order to estimate the ignition characteristic curve 71 without reducing the drivability, according to one embodiment of the present invention, the fluctuating signal generator 41 is introduced as described above referring to FIG. 3. The fluctuating signal generator 41 generates a fluctuating signal that meets self-excitation conditions for estimating the characteristic curve 71. The number of self-excitation conditions is equal to or greater than a value that is obtained by adding one to the number of coefficients contained in a function that expresses the characteristic curve 71. The function will be described later.

In this embodiment, since three coefficients are included in the function expressing the characteristic curve 71, the number of the self-excitation (PE) conditions is set to four. Thus, the fluctuating signal generator 41 generates a signal DIGID by combining three sine waves as shown in the equation (8). $\delta 1$, $\delta 2$ and $\delta 3$ represent respective amplitudes. $\omega 2$, $\omega 2$ and $\omega 3$ are set to be an integral submultiple of a control frequency (in this embodiment, a frequency corresponding to the combustion cycle). $\phi$ and $\phi'$ represent respective phases. These parameters are predetermined.

$$\text{DIGID}(k)=\delta 1 \cdot \sin(\omega 1 \cdot k)+\delta 2 \cdot \sin(\omega 2 \cdot k+\psi)+\delta 1 \cdot \sin(\omega 3 \cdot k+\psi') \qquad (8)$$

Alternatively, the fluctuating signal DIGID may be generated to meet five or more self-excitation conditions. For example, a random wave containing an infinite number of sine waves may be generated as the fluctuating signal DIGID. Or, the fluctuating signal DIGID may be generated as a series of pulse signals (for example, M-sequence).

Figure 10:
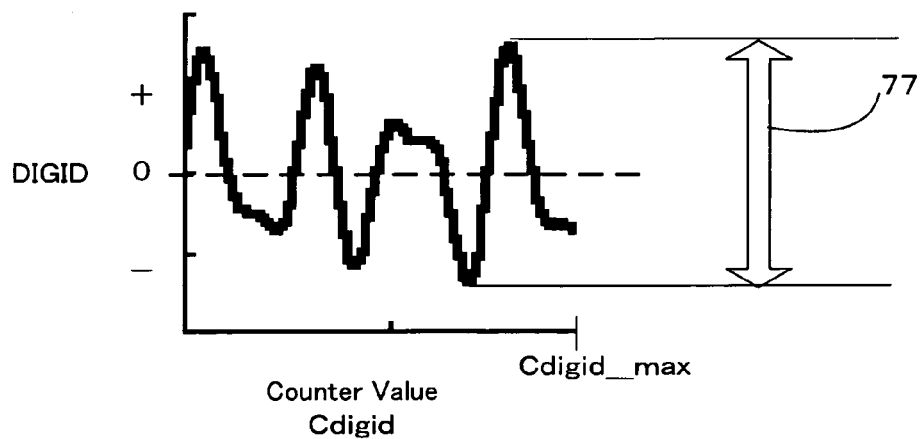
FIG. 10 shows a waveform of a fluctuating signal in accordance with one embodiment of the present invention.

FIG. 10 shows an example of the waveform of the fluctuating signal DIGID. The horizontal axis indicates the value of a counter Cdigid. The fluctuating signal DIGID is generated to have a cycle length of Cdigid_max. The fluctuating signal DIGID corresponding to each counter value Cdigid may be stored as a map in the memory 1c (FIG. 1).

The counter value is incremented in each control cycle. The fluctuating signal DIGID corresponding to the counter value is extracted from the map. If the counter value reaches the Cdigid_max, the counter is reset to zero.

A reference number 77 indicates a range of the value that the fluctuating signal DIGID can take. The fluctuating signal DIGID is generated to fluctuate between positive and negative with respect to zero. Alternatively, the range where the fluctuating signal DIGID fluctuates may be biased toward either positive or negative.

The fluctuating width 77 of the fluctuating signal DIGID is preferably set so that it is within the fluctuating width 73 of the indicated mean effective pressure as shown in FIG. 9 that is observed in a regular operating condition of the engine. Such setting of the fluctuating width 77 prevents the fluctuating signal DIGID from influencing the combustion condition.

Figure 11:
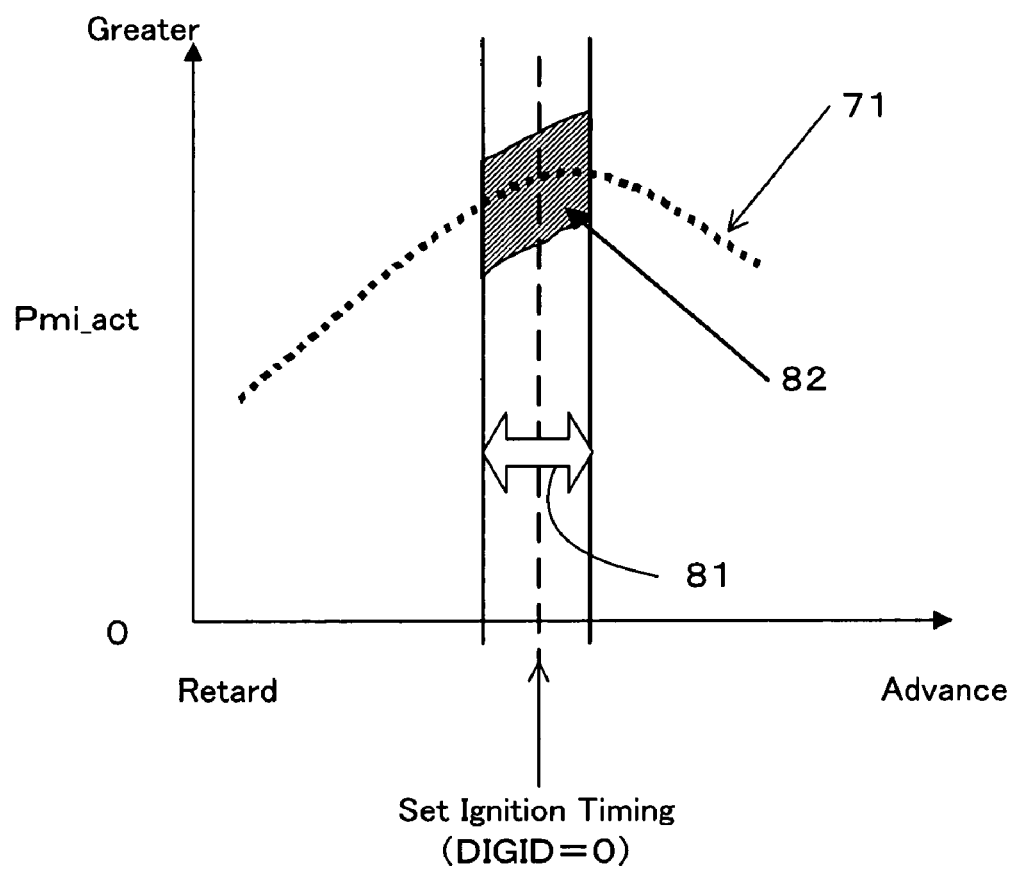
FIG. 11 is a diagram for explaining fluctuation of the ignition timing caused by a fluctuating signal in accordance with one embodiment of the present invention.

Referring to FIG. 11, a method, which is performed by the MBT calculator 44, for estimating the ignition timing characteristic curve 71 by using the fluctuating signal DIGID will be described. A range 81 shown in the figure corresponds to the width 77 within which the fluctuating signal DIGID of FIG. 10 fluctuates. As described above, the set ignition timing is a sum of the reference value IGBASE and the correction value DIGOP. By adding the fluctuating signal DIGID to the set ignition timing, the resultant ignition timing signal IGLOG fluctuates within the range 81.

A shaded area 82 represents a range within which the indicated mean effective pressure is distributed when the ignition timing fluctuates within the range 81 due to the fluctuating signal DIGID. The characteristic curve 71 is estimated based on the indicated mean effective pressure that is distributed within the area 82.

As described above referring to FIG. 9, the form (the inclination and curvature) of the characteristic curve cannot be estimated when the ignition timing is fixed to a value extracted from the map because the indicated mean effective pressure is distributed on the line 75. However, according to one embodiment of the present invention, the characteristic curve can be estimated by fluctuating the ignition timing within the range 81 through the use of the fluctuating signal DIGID because the indicated mean effective pressure distributed within the range 82, which is not one-dimensional like the line 81, but has two-dimensional extent, is acquired.

A specific method for estimating the characteristic curve 71 will be described. At first, the characteristic curve 71 is defined as a second-order function Fmbt of the fluctuating signal DIGID, as shown in the equation (9).

$$Fmbt(\text{DIGID})=\text{Aigop} \cdot \text{DIGID}^2+\text{Bigop} \cdot \text{DIGID}+\text{Cigop} \qquad (9)$$

Aigop, Bigop and Cigop are coefficients to be identified. These coefficients are identified from the indicated mean effective pressure that is distributed within the range 82 due to the fluctuating signal DIGID. The identification method will be described later.

Figure 12:
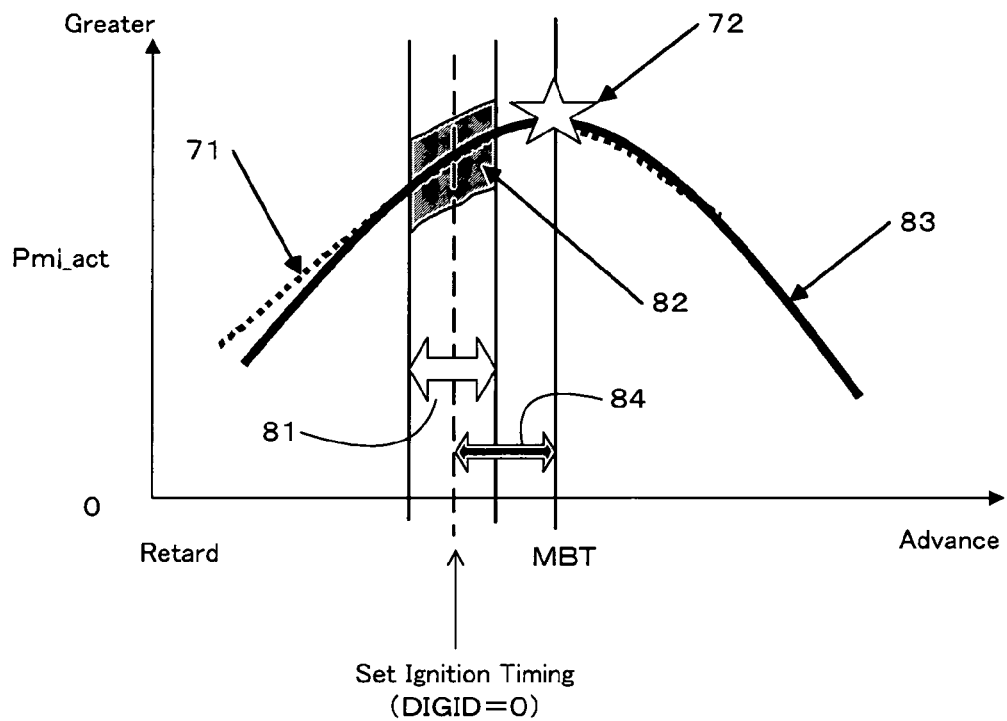
FIG. 12 shows an estimated ignition timing curve and a calculated optimum ignition timing in accordance with one embodiment of the present invention.

FIG. 12 shows an estimated curve 83 that is derived by the identified coefficients Aigop, Bigop and Cigop. It is seen that the estimated curve 83 is almost identical with the actual characteristic curve 71. An error EIGOP between the set ignition timing and the optimum ignition timing MBT is shown by an arrow 84. Since a maximum value 72 of the estimated curve 83 can be determined by differentiating the equation (9), the error EIGOP is calculated as shown in the equation (10).

$$EIGOP = \frac{-Bigop}{2 \cdot Aigop} \quad (10)$$

The set ignition timing has the error EIGOP with respect to the optimum ignition timing MBT. By controlling the set ignition timing so as to eliminate the error, ignition at the optimum ignition timing MBT can be implemented. This control scheme will be described later in the section of "ignition timing controller".

The characteristic curve 71 is not a second-order function in the strict sense. Therefore, when the set ignition timing is apart from the optimum ignition timing MBT, the estimated curve may include an error. However, by causing the error EIGOP to converge to zero by the ignition timing controller 45, the set ignition timing can converge to the optimum ignition timing MBT.

Now, an identification method for the coefficients Aigop, Bigop and Cigop included in the above-described function Fmbt will be described. These coefficients are identified so that an estimated mean effective pressure Pmi_hat that is determined by substituting the fluctuating signal DIGID determined in the previous control cycle into the function Fmbt of the estimated curve is equal to Pmi_act that is calculated in the current cycle by the mean effective pressure calculator 43 based on the in-cylinder pressure detected as a result of using the fluctuating signal DIGID determined in the previous control cycle.

The identification method may use a well-known technique such as least squares method and a maximum likelihood method. In one embodiment of the present invention, a delta (δ) correction method, which is a more efficient technique, is used. The detail of the delta correction method is described in Japanese Patent No. 3304845. A method for identifying these coefficients by using the delta correction method will be briefly described.

A recursive identification algorithm using the delta correction method is expressed as shown in the equation (11). A coefficient vector θ (k) is expressed by a sum of a reference value θ_base(k) and its update component dθ (k). δ is a forgetting coefficient vector, which is expressed in the equation (16).

$$\theta(k) = \theta\_base(k) + d\theta(k) \quad (11)$$

$$d\theta(k) = \delta \cdot d\theta(k-1) + KP(k) \cdot E\_id(k) \quad (12)$$

where $\theta^T(k) = [Aigop(k), Bigop(k), Cigop(k)]$ (13)

$$d\theta^T(k) = [Aigop(k) - Aigop\_base, dBigop(k), dCigop(k)] \quad (14)$$

$$\theta\_base^T(k) = [Aigop\_base(k), 0, Cigop\_base(k)] \quad (15)$$

$$\delta = \begin{bmatrix} 1 & 0 & 0 \\ 0 & \delta' & 0 \\ 0 & 0 & \delta' \end{bmatrix} (0 < \delta' < 1) \quad (16)$$

In the forgetting coefficient vector δ, an element corresponding to Aigop is set to a value of one and elements corresponding to Bigop and Cigop are set to a value greater than zero and less than one. Such setting has an effect that only Aigop remains and Bigop and Cigop are forgotten when the identification error E_id converges to zero.

The identification error E_id(k) in the equation (12) is expressed by the equation (17). That is, the identification error E_id is an error between the indicated mean effective pressure Pmi_act calculated by the mean effective pressure calculator 43 based on the in-cylinder pressure that is detected as a result of including in the ignition timing signal the fluctuating signal DIGID determined in the previous control cycle, and the estimated indicated mean effective pressure Pmi_hat that is calculated based on the function Fmbt using as an input the fluctuating signal DIGID determined in the previous control cycle.

$$E\_id(k) = Pmi\_act(k) - Pmi\_hat(k) \quad (17)$$

where (18)

$$Pmi\_hat(k) = \theta^T(k) \cdot \zeta(k)$$
$$= Aigop(k) \cdot DIGID(k-1)^2 + Bigop \cdot DIGID(k-1) + Cigop(k)$$

$$\zeta^T(k) = [DIGID(k-1)^2, DIGID(k-1), 1] \quad (19)$$

A gain KP(k) is expressed by the equation (20). P is expressed by the equation (21). Depending on the setting of the coefficients λ1 and λ2 of the equation (20), the type of the identification algorithm is determined as follows:

λ1=1 and λ2=0: fixed gain algorithm

λ1=1 and λ2=1: least squares algorithm

λ1=1 and λ2=λ: gradually decreasing gain algorithm (λ is a predetermined value other than 0 and 1)

λ1=λ and λ2=1: weighted least squares algorithm (λ is a predetermined value other than 0 and 1)

$$KP(k) = \frac{P(k-1) \cdot \zeta(k)}{1 + \zeta^T(k) \cdot P(k-1) \cdot \zeta(k)} \quad (20)$$

$$P(k) = \frac{1}{\lambda 1}\left(I - \frac{\lambda 2 \cdot P(k-1) \cdot \zeta(k) \cdot \zeta^T(k)}{\lambda 1 + \lambda 2 \cdot \zeta^T(k) \cdot P(k-1) \cdot \zeta(k)}\right)P(k-1) \quad (21)$$

where $I$ is a unit matrix of (3×3)

When the ignition timing fully converges to the optimum ignition timing MBT, variations in the indicated mean effective pressure with respect to the fluctuation of the ignition timing become small. In such a steady state, according to other identification methods, the identified coefficients may drift.

In contrast, according to the above-described method of the present invention, the coefficient vector θ (k) is expressed by the sum of the reference value θ_base(k) and its update component dθ (k) as shown in the equation (11). When the identification error E_id fully approaches zero, the update component dθ converges to (Aigop(k−1)-Aigop_base, 0, 0) as seen from the equation (12). Therefore, the coefficient vector θ converges to (Aigop(k−1), 0, Cigop_base) as seen from the equation (11). Since the coefficient Aigop is identified so that the value of Aigop does not become zero, division by zero in the equation (10) can be avoided. Accordingly, it is prevented that the feedback control to the optimum ignition timing MBT diverges.

Further, when the identification error E_id fully approaches zero, the coefficient Bigop converges to zero and hence the error EIGOP (shown in the equation (10)) from the optimum ignition timing MBT becomes zero. Since the error EIGOP converges to zero, the feedback control for causing the ignition timing to converge to the optimum ignition timing MBT automatically terminates.

When variations in the indicated mean effective pressure with respect to the fluctuation of the ignition timing become large due to some abnormality in the combustion, a correlation between the fluctuating signal DIGID and the mean effective pressure Pmi_act may not be kept. In such a case, the error E_id appears as white noise and the average of the error E_id becomes zero. As a result, the coefficient vector θ converges to the reference value θ_base, thereby automatically terminating the feedback control.

Thus, according to the delta correction method, the identified coefficients are prevented from drifting in a steady state where the identification error E_id is very small.

In one embodiment of the present invention, a function Lim_a is applied to the identified coefficient Aigop as shown in the equation (22). The function Lim_a(x) is a function for restricting "x" to a value that is less than zero. The function Lim_a(Aigop) restricts Aigop to have a negative value.

$$\text{Aigop} \Leftarrow \text{Lim}\_a(\text{Aigop}) \qquad (22)$$

Figure 13:
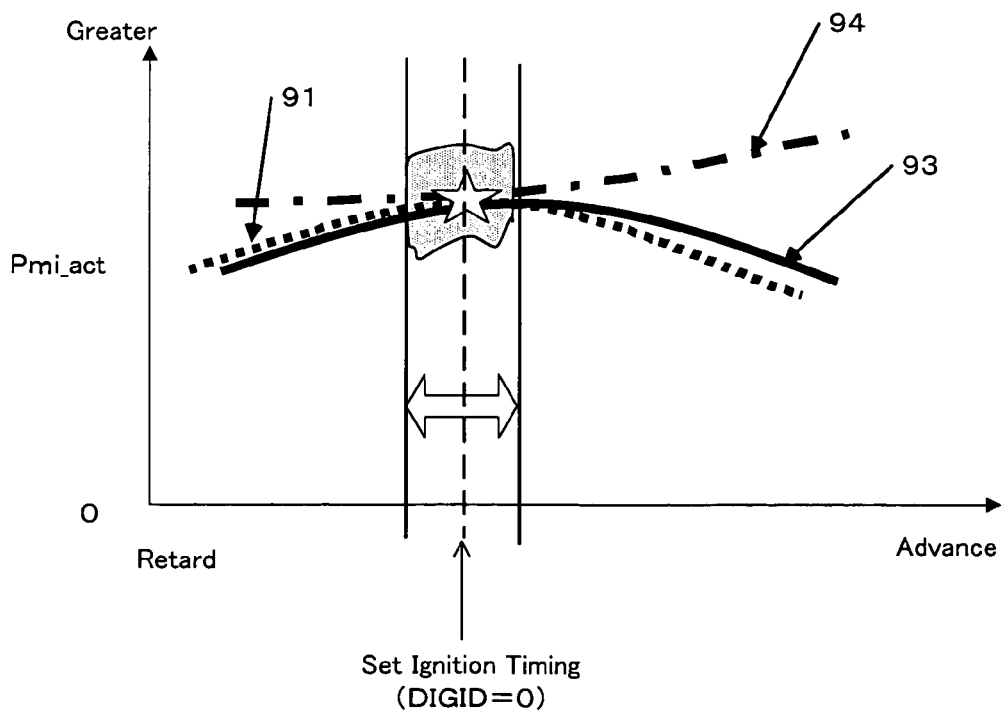
FIG. 13 is a diagram for explaining a reason for performing a limit process upon one of the coefficients to be identified in accordance with one embodiment of the present invention.

The reason for applying the function Lim_a that acts to restrict the coefficient Aigop to a negative value will be described referring to FIG. 13. FIG. 13 shows a state in which the set ignition timing has fully converged to the optimum ignition timing MBT and the indicated mean effective pressure Pmi_act exhibits almost no fluctuating (that is, Pmi_act is almost flat). The actual characteristic curve is shown by reference number 91. In such a state, the estimated curve may be erroneously determined as a downward convex curve 94 (that is, Aigop≧0). Such erroneous estimation may cause an error in calculating the optimum ignition timing MBT. In order to avoid such erroneous estimation, the function Lim_a is applied to calculate the estimated curve as a curve 93 that has an upward convex (that is, Aigop<0).

Ignition Timing Controller

The ignition timing controller 45 controls the ignition timing to converge to the optimum ignition timing that is calculated from the estimated curve. More specifically, the correction value DIGOP is calculated so as to cause the error EIGOP from the optimum ignition timing MBT to converge to zero. By adding the correction value DIGOP to the reference value IGBASE, the error EIGOP is compensated.

The ignition timing controller 45 uses a response assignment control to calculate a control input (that is, the correction value DIGOP). The calculation of DIGOP is expressed in the equation (23).

$$DIGOP(k) = -Krch \cdot \sigma(k) - Kadp \sum_{i=0}^{k} \sigma(i) \qquad (23)$$

$$\sigma(k) = EIGOP(k) + POLE \cdot EIGOP(k-1) \qquad (24)$$
where Krch, Kadp > 0

The response assignment control is a control that is capable of specifying a convergence speed of a controlled variable (the error EIGOP, in this case) to a desired value (zero, in this case). According to the response assignment control, the error EIGOP can converge to zero without overshooting.

A switching function σ is established in the response assignment control. POLE is a response assignment parameter of the switching function σ to define a convergence speed of the error EIGOP. POLE is preferably set to satisfy −1<POLE<0.

The equation σ(k)=0 is called an equivalent input system, which specifies convergence characteristic of the error EIGOP. Assuming that σ(k)=0, the switching function σ of the equation (24) is expressed as shown in the equation (25).

$$EIGOP(k) = -POLE \cdot EIGOP(k-1) \qquad (25)$$

Figure 14:
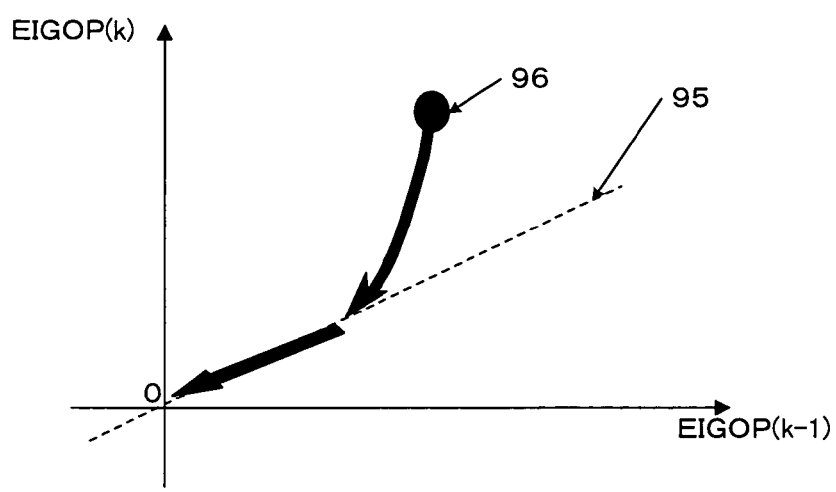
FIG. 14 shows a switching function in a response assignment control in accordance with one embodiment of the present invention.

Here, referring to FIG. 14, the switching function will be described. In a phase plane with EIGOP(k) on the vertical axis and EIGOP(k−1) on the horizontal axis, the switching function σ of the equation (25) is expressed as a line 95. This line 95 is called a switching line. Assuming that an initial value of the state quantity (EIGOP(k−1), EIGOP(k)) that is a combination of EIGOP(k−1) and EIGOP(k) is represented by a point 96. The response assignment control acts to place the state quantity represented by the point 96 on the line 95 and then constrains it on the line 95.

According to the response assignment control, since the state quantity is held on the switching line 95, the state quantity can stably converge to the origin zero without being influenced by disturbances. In other words, by constraining the state quantity (EIGOP(k−1), EIGOP(k)) on such a stable system having no input shown by the equation (25), the error EIGOP can converge to zero robustly against disturbances and modeling errors.

Since the phase plane regarding the switching function σ has two dimensions in this embodiment, the switching line is represented by a straight line 95. When the phase plane has three dimensions, the switching line is represented by a plane. When the phase plane has four or more dimensions, the switching line is represented by a hyperplane.

The response assignment parameter POLE can be variably set. By adjusting the value of the response assignment parameter POLE, the convergence speed of the error EIGOP can be designated.

Figure 15:
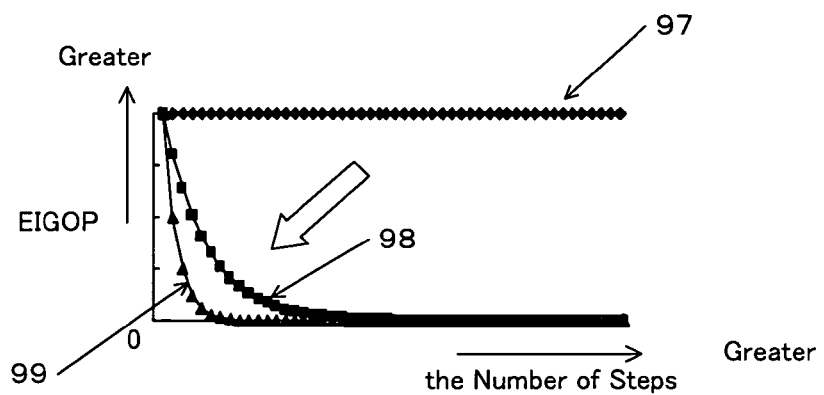
FIG. 15 shows a convergence speed of a controlled variable specified by a response assignment parameter in a response assignment control in accordance with one embodiment of the present invention.

Referring to FIG. 15, reference numbers 97, 98 and 99 show the convergence speed of the error EIGOP in the cases where the response assignment parameter POLE takes a value of −1, −0.8 and −0.5, respectively. The convergence speed of the deviation EIGOP increases as the absolute value of the response assignment parameter POLE decreases.

Effect of Ignition Timing Control in Accordance with One Embodiment

Figure 16:
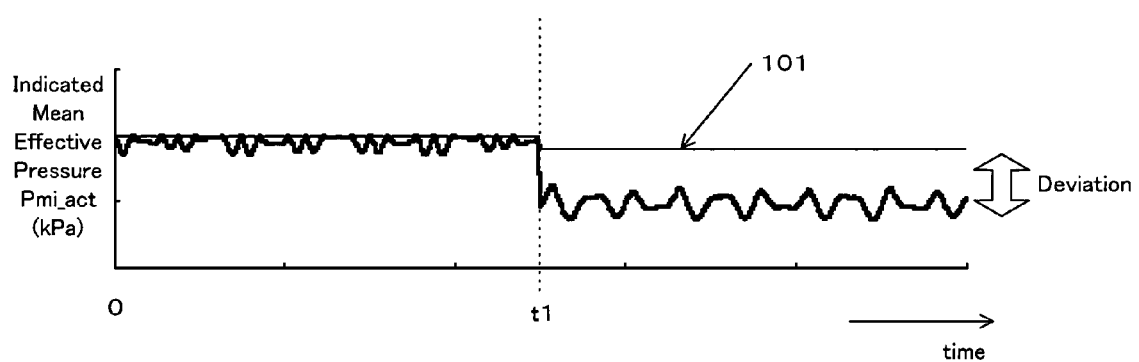
FIG. 16 shows an indicated mean effective pressure when a feedback control to an optimum ignition timing is not performed.
Figure 17:
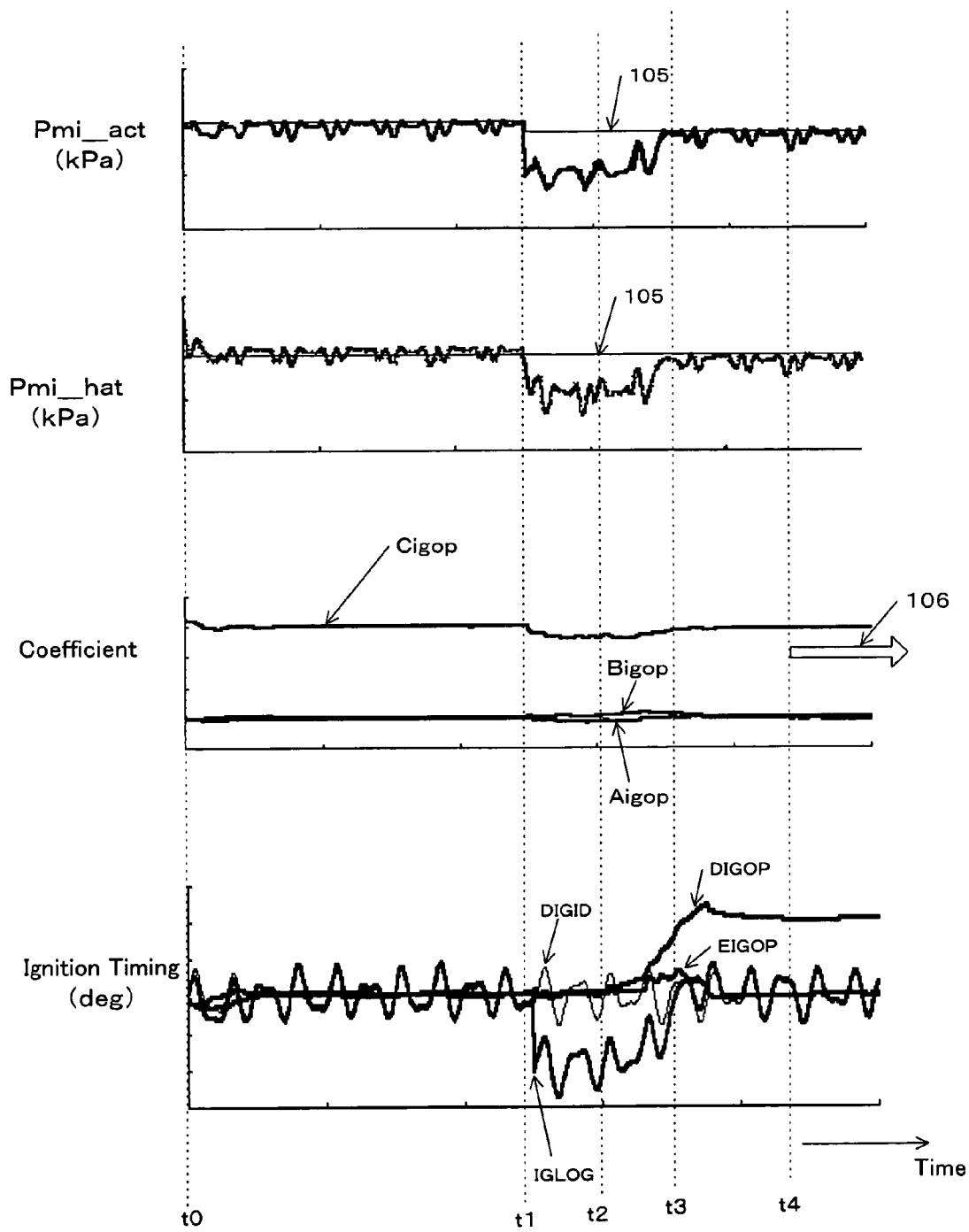
FIG. 17 shows behaviors of various parameters when a feedback control to an optimum ignition timing is performed in accordance with one embodiment of the present invention.

Referring to FIGS. 16 and 17, the effect of the ignition timing control in accordance with one embodiment of the present invention will be described.

FIG. 16 shows the actual indicated mean effective pressure Pmi_act when the ignition timing IGLOG is calculated by adding the fluctuating signal DIGID to the reference value IGBASE obtained from a predetermined map based on the current operating condition of the engine. In the example, the feedback control to the optimum ignition timing MBT using the correction value is not performed.

At time t1, the operating condition of the engine changes. The reference value IGBASE based on the operating condition detected after the change is extracted from the map. It is assumed that the reference value IGBASE thus extracted from the map has a retarded value with respect to the optimum ignition timing. As a result, the ignition timing retards. The actual indicated mean effective pressure Pmi_act decreases as the ignition timing retards. The level of the indicated mean effective pressure corresponding to the optimum ignition timing MBT is shown by reference number 101. Since the ignition timing cannot converge to the MBT, a "deviation" between the actual indicated mean effective pressure Pmi_act and the level 101 is not eliminated.

Thus, if the feedback control for causing the ignition timing to converge to the optimum timing is not performed, the indicated mean effective pressure is maintained at a decreased level, which may reduce the combustion efficiency.

FIG. 17 shows a case where the feedback control for the ignition timing in accordance with one embodiment of the present invention is performed. Since the fluctuating signal DIGID is added to the set ignition timing signal (IGBASE+DIGOP), the ignition timing signal IGLOG fluctuates.

During a time period from t0 to t1, the ignition timing signal IGLOG has converged to the optimum ignition timing MBT and hence the actual indicated mean effective pressure Pmi_act is maintained at a level corresponding to the MBT. Since the ignition timing signal IGLOG has converged to the MBT, the value of the correction value DIGOP is almost zero.

At time t1, the operating condition of the engine changes. Due to this change, the reference value IGBASE deviates from the MBT and hence the ignition timing signal IGLOG deviates from the MBT. As a result, the actual indicated mean effective pressure Pmi_act decreases below the level 105 corresponding to the MBT.

The MBT calculator 44 identifies the coefficients Aigop, Bigop and Cigop so that the indicated mean effective pressure Pmi_hat that is estimated by the function Fmbt based on the fluctuating signal DIGID becomes equal to the actual indicated mean effective pressure Pmi_act. As a result, the estimated indicated mean effective pressure Pmi_hat follows the actual indicated mean effective pressure Pmi_act. By identifying the coefficients Aigop, Bigop and Cigop, the optimum ignition timing MBT is calculated. In addition, the error EIGOP of the set ignition timing (IGBASE+DIOP) with respect to the MBT is calculated.

It is seen that the error EIGOP is rising around time t2. The ignition timing controller 45 calculates the correction value DIGOP so as to compensate for the error EIGOP. It is seen that the correction value DIGOP rises to follow the rise of the error EIGOP.

By adding the correction value DIGOP, the ignition timing signal IGLOG is corrected to advance. As a result, the ignition timing signal IGLOG returns to the optimum ignition timing MBT around time t3. Since the ignition timing signal IGLOG has converged to the MBT, the actual indicated mean effective pressure Pmi_act returns to the optimum level 105.

In this simulation, the reference values are set as follows: Aigop_base=−2, Bigop_base=0 and Cigop_base=300. As described above, when the identification error fully converges to zero and hence the ignition timing signal IGLOG converges to the optimum ignition timing MBT, the coefficient Bigop converges to its reference value (=zero). As a result, the error EIGOP is set to zero, thereby automatically terminating the feedback control (an arrow 106 indicates that the feedback control has reached the automatic termination at around time t4).

Control Flow

Figure 18:
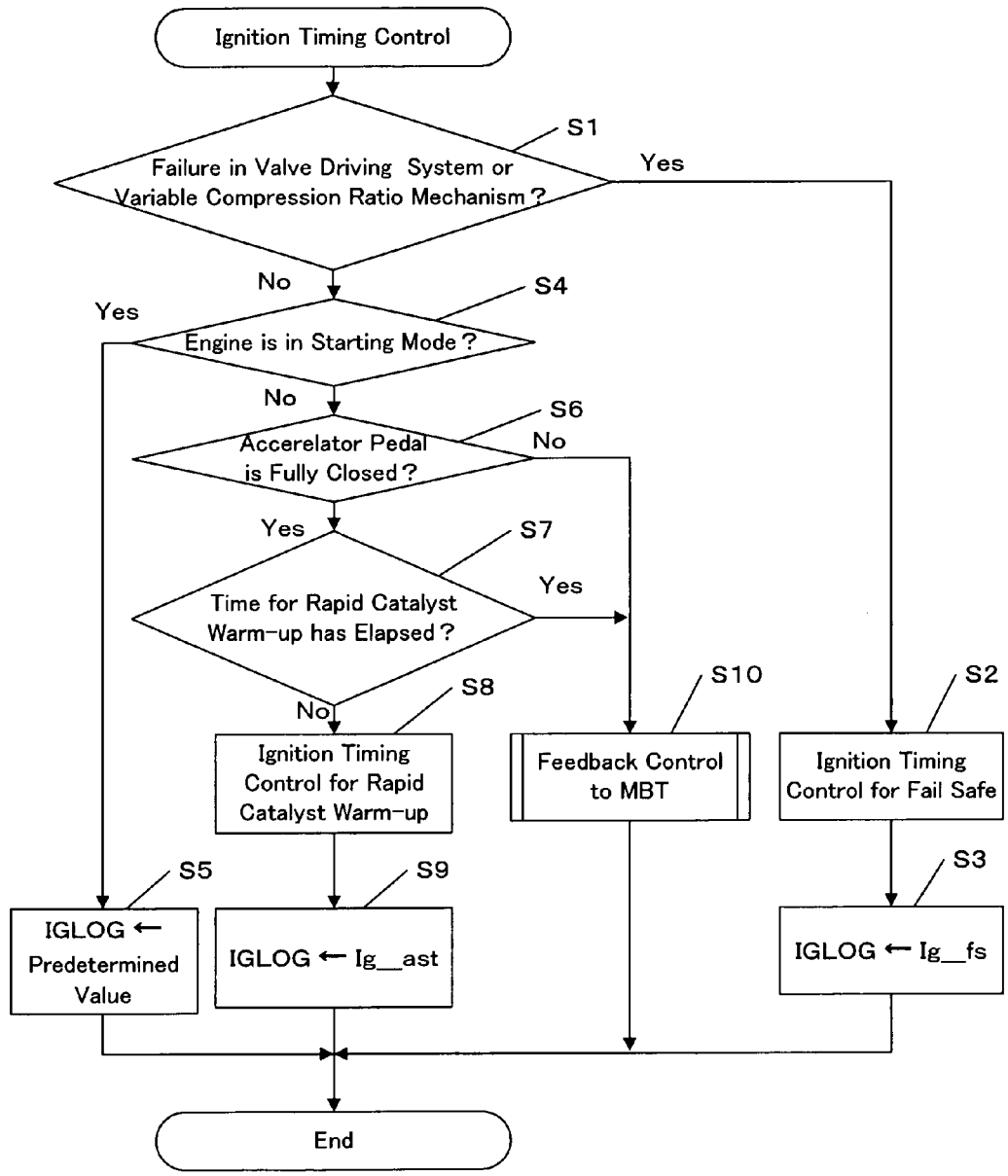
FIG. 18 is a flowchart of a main routine of an ignition timing control in accordance with one embodiment of the present invention.

FIG. 18 shows a main routine of a process for the ignition timing control. This routine is performed in synchronization with the combustion cycle. This flowchart shows an exemplary process for a single-cylinder engine. In the case of a multiple-cylinder engine, the following process is performed for each combustion cycle of each cylinder. For example, in the case of a four-cylinder engine, the process is started for one of the four cylinders at every crank angle 180 degrees.

In step S1, it is determined whether a failure is detected in a valve driving system (which may include a variable phase mechanism and a variable lift mechanism) or a variable compression ratio mechanism. Since a torque control by the valve driving system cannot be performed if a failure is detected, a fail safe control is performed to calculate an ignition timing for keeping the engine rotational speed at a constant level (S2).

The fail safe control can be implemented, for example, by the above-described response assignment control. The ignition timing Ig_fs is calculated so that the engine rotational speed converges to a predetermined desired value (for example, 2000 rpm). Calculation for implementing the response assignment control for fail safe is performed, for example, according to the following equations:

$$\text{Ig\_fs} = \text{Ig\_fs\_base} - Krch \cdot \sigma'(k) - Kadp' \cdot \sum_{i=0}^{k} \sigma'(i) \quad (26)$$

$$\sigma'(k) = Enfs(k) + POLE' \cdot Enfs(k-1) \quad (27)$$

$$Enfs(k) = NE(k) - \text{NE\_fs} \quad (28)$$

Krch', Kadp': feedback gain
POLE': response assignment parameter (−1<POLE'<0)
NE_f : desired value for engine rotational speed (ex. 2000 rpm)
Ig_fs_base: reference value for fail safe (ex. 0 deg)

In step S3, the calculated Ig_fs is set in the ignition timing IGLOG.

If no failure is detected in step S1, it is determined whether the engine is in the starting mode (S4). If the engine is in the starting mode, the ignition timing IGLOG is set to a predetermined value (for example, +10 degrees) (S5).

If the engine is not in the starting mode, it is determined in step S6 whether an accelerator pedal is fully closed. If the accelerator pedal is fully closed, it indicates that the engine is in an idle condition. Then, in step S7, it is determined whether a predetermined time that is set for performing the rapid catalyst warm-up control has elapsed. If the predetermined time has not yet elapsed, it indicates that the rapid catalyst warm-up control is still underway. The rapid catalyst warm-up control is a control for increasing the temperature of the catalyst so as to rapidly activate the catalyst. During the rapid catalyst warm-up control, the ignition timing is retarded so that the engine rotational speed converges to a desired value. This control is implemented through the response assignment control in a similar way to step S2. The following are equations for implementing the response assignment control.

$$\text{Ig\_ast} = \text{Ig\_ast\_base} - Krch'' \cdot \sigma''(k) - Kadp'' \cdot \sum_{i=0}^{k} \sigma''(i) \quad (29)$$

$$\sigma''(k) = Enast(k) + POLE'' \cdot Enast(k-1) \quad (30)$$

$$Enast(k) = NE(k) - \text{NE\_ast} \quad (31)$$

Krch", Kadp": feedback gain
POLE": response assignment parameter (−1<POLE"<0)
NE_ast: desired value for engine rotational speed (ex. 1800 rpm)

Ig_ast_base: reference value for catalyst temperature warm-up (ex. +5 deg)

In step S9, the calculated Ig_ast is set in the ignition timing IGLOG.

If the rapid catalyst warm-up control is completed in step S7, the feedback control (FIG. 19) to the optimum ignition timing MBT in accordance with the present invention is performed (S10).

Figure 19:
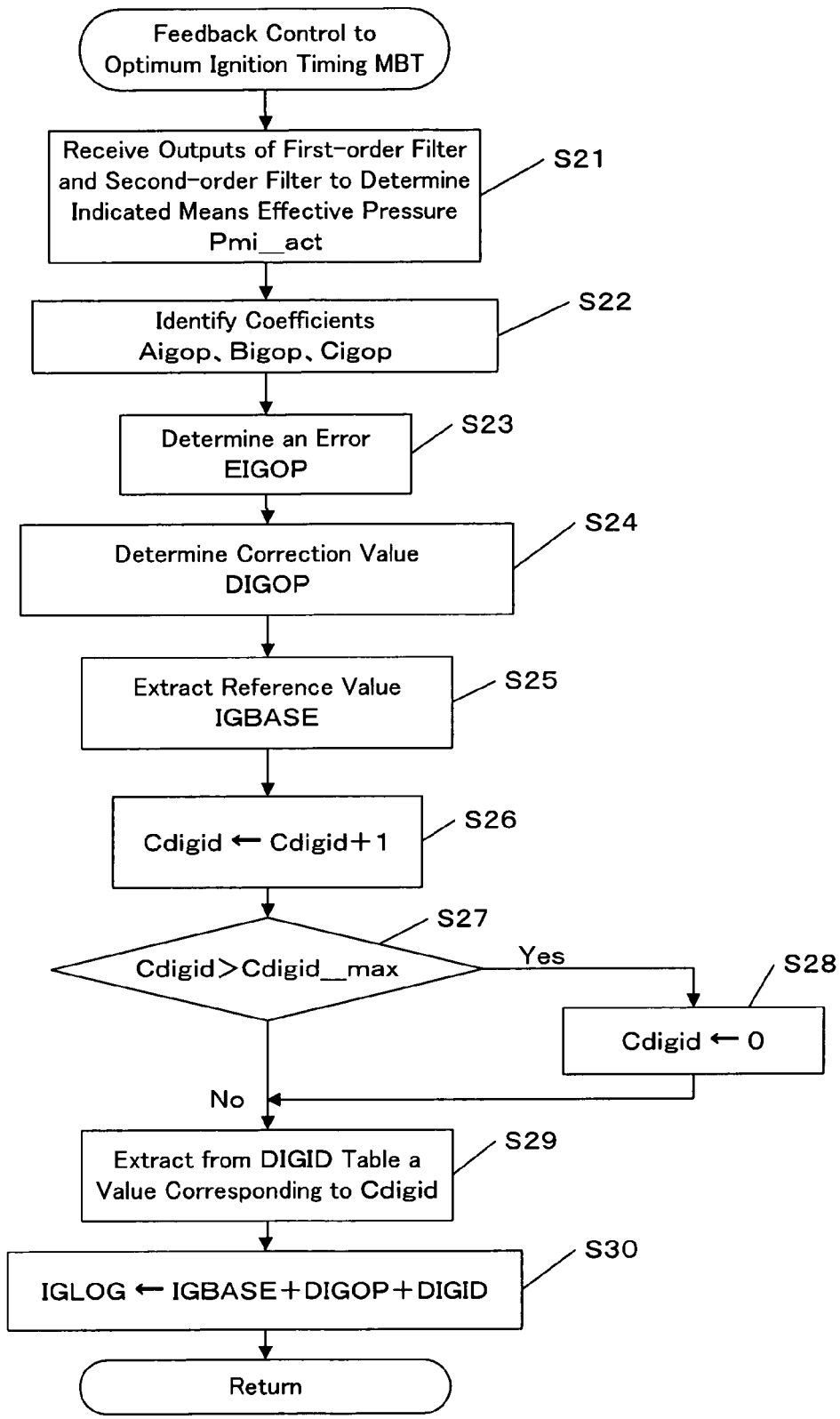
FIG. 19 is a flowchart of a feedback control to an optimum ignition timing in accordance with one embodiment of the present invention.

FIG. 19 shows a flowchart of the feedback control to the optimum ignition timing MBT.

Figure 20:
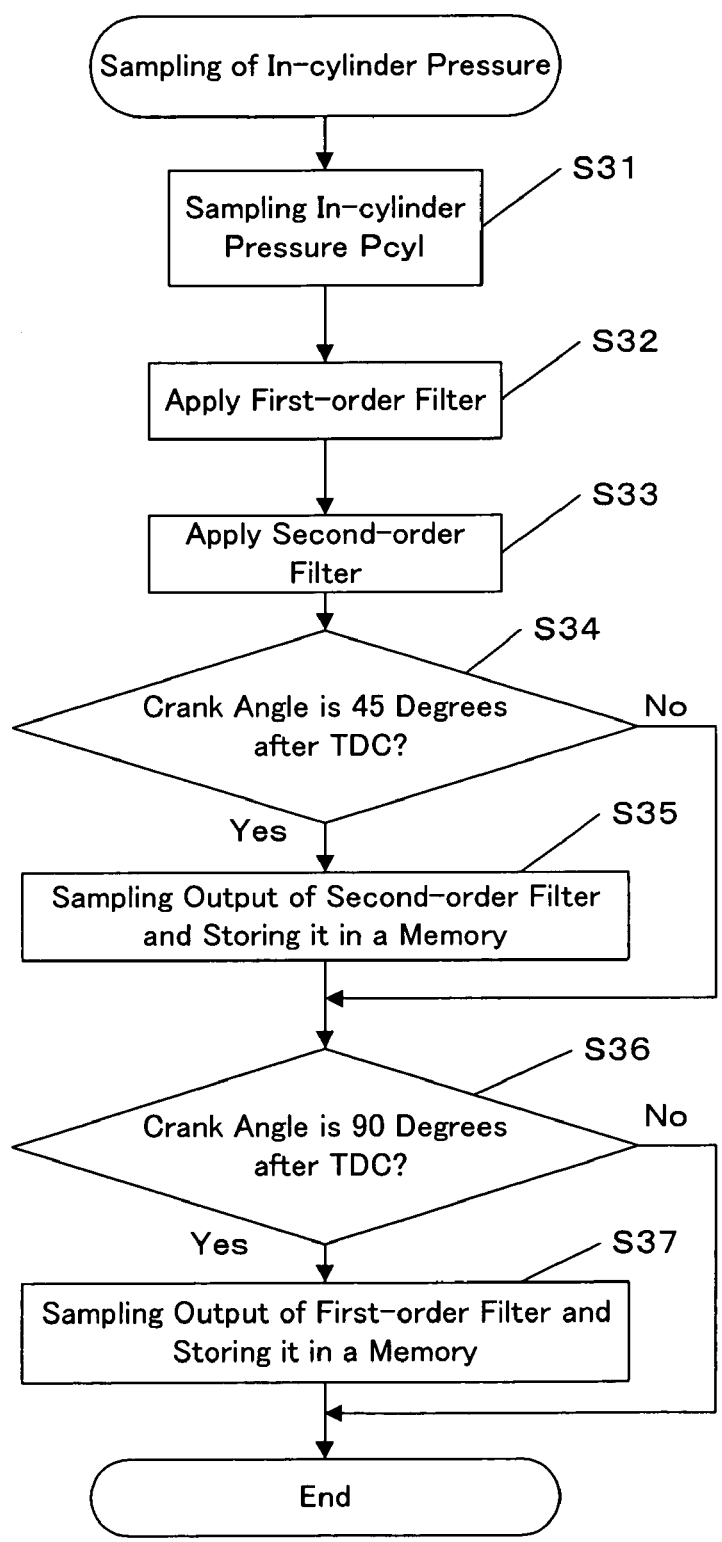
FIG. 20 is a flowchart of a sampling process for the in-cylinder pressure in accordance with one embodiment of the present invention.

In step S21, values obtained by sampling the output of the first-order filter and the output of the second-order filter are received and the indicated mean effective pressure Pmi_act is calculated according to the above-described equation (3). A flowchart for sampling the output of the first-order filter and the output of the second-order filter is shown in FIG. 20.

In step S22, the coefficients Aigop, Bigop and Cigop are calculated in accordance with the above-described equations (11) to (22) to determine the estimated curve as expressed in the equation (9). In step S23, the error EIGOP is calculated based on the equation (10).

In step S24, the response assignment control as expressed in the equations (23) and (24) is performed to calculate the correction value for causing the error EIGOP to converge to zero.

In step S25, the reference value IGBASE is determined by referring to a map as shown in FIG. 4 based on the current engine rotational speed NE and the current intake air amount Gcyl.

In step S26, the counter value Cdigid is incremented by one. As described above referring to FIG. 10, the fluctuating signal depends on the counter value Cdigid. If the counter value Cdigid exceeds Cdigid_max that indicates a cycle length of the fluctuating signal DIGID in step S27, the counter is reset (S28). If the counter value Cdigid is equal to or less than Cdigid_max, the process proceeds to step S29.

In step S29, a table as shown in FIG. 10 is referred to determine the current value of the fluctuating signal DIGID corresponding to the counter value Cdigid.

In step S30, the reference value IGBASE, the correction value DIGOP and the fluctuating signal DIGID are summed up to determine the ignition timing signal IGLOG.

Steps S21 through S24 may be performed in parallel with steps S25 through S29.

FIG. 20 is a flowchart of a sampling process for the in-cylinder pressure. This routine is performed at every crank angle 15 degrees.

In step S31, the detection value Pcyl of the in-cylinder pressure sensor is sampled. In step S32, the first-order filter is applied to the sampled detection value Pcyl. In step S33, the second-order filter is applied to the detection value Pcyl.

In step S34, it is determined whether the current crank angle is 45 degrees after TDC. If the answer of the step is Yes, the output of the second-order filter is sampled and stored in a memory (S35). In step S36, it is determined whether the current crank angle is 90 degrees after TDC. If the answer of the step is Yes, the output of the first-order filter is sampled and stored in a memory (S37).

The second-order output $C2 \cdot \cos(\phi 2)$ sampled in step S35 and the first-order output $C1 \cdot \cos(\phi 1)$ sampled in step S37 are passed to the step S21 of FIG. 19.

The present invention can be applied to a general-purpose engine (for example, an outboard motor).

What is claimed is:

1. An apparatus for controlling an ignition timing of an engine, comprising:

an ignition timing calculator for adding a fluctuating component to a set ignition timing to calculate a final ignition timing for igniting the engine;

a mean effective pressure calculator for calculating an indicated mean effective pressure for an in-cylinder pressure detected when the engine has been ignited according to the final ignition timing;

an MBT calculator for estimating an ignition timing characteristic curve that represents a correlation between the indicated mean effective pressure and the fluctuating component and for determining an optimum ignition timing from the characteristic curve; and a controller for controlling the set ignition timing to converge to the optimum ignition timing.

2. The apparatus of claim 1, wherein the ignition timing characteristic curve is represented by a function, an input of the function being the fluctuating component and an output of the function being the indicated mean effective pressure;

wherein the MBT calculator further includes an identifier for identifying coefficients associated with the fluctuating component in the function based on the indicated mean effective pressure calculated by the mean effective pressure calculator to estimate the characteristic curve based on the identification of the coefficients.

3. The apparatus of claim 2, further comprising a generator for generating the fluctuating component, wherein the generator generates the fluctuating component to meet self-excitation conditions for identifying the coefficients of the function.

4. The apparatus of claim 2, wherein the identifier is further configured to:

determine update components for the coefficients so that an error between the indicated mean effective pressure calculated by the mean effective pressure calculator and an estimated indicated mean effective pressure estimated from the function converges to zero;

add the update components to predetermined reference values to determine the coefficients, thereby causing the coefficients to converge to the reference values as the error converges to zero;

wherein the reference values are predetermined so that the control for controlling the set ignition timing to converge to the optimum ignition timing stops when the coefficients have converged to the reference values.

5. The apparatus of claim 2, wherein a limit process is applied to at least one of the coefficients so that it is prevented that the characteristic curve is estimated as a downward convex curve.

6. The apparatus of claim 1, wherein the mean effective pressure calculator is further configured to extract an alternating component from the detected in-cylinder pressure and to calculate the indicated mean effective pressure based on the alternating component.

7. The apparatus of claim 1, wherein the controller uses a response assignment control to control the set ignition timing, the response assignment control being capable of specifying a response characteristic of the set ignition timing to the optimum ignition timing.

8. A method for controlling an ignition timing of an engine, comprising the steps of:

(a) adding a fluctuating component to a set ignition timing to calculate a final ignition timing for igniting the engine;

(b) calculating an indicated mean effective pressure for an in-cylinder pressure detected when the engine has been ignited according to the final ignition timing;

(c) estimating an ignition timing characteristic curve that represents a correlation between the indicated mean effective pressure and the fluctuating component;

(d) determining an optimum ignition timing from the characteristic curve; and (e) controlling the set ignition timing to converge to the optimum ignition timing.

9. The method of claim 8, wherein the ignition timing characteristic curve is represented by a function, an input of the function being the fluctuating component and an output of the function being the indicated mean effective pressure;

wherein the step (c) further comprises the step of:

(c1) identifying coefficients associated with the fluctuating component in the function based on the indicated mean effective pressure to estimate the characteristic curve based on the identification of the coefficients.

10. The method of claim 9, further comprising the step of generating the fluctuating component to meet self-excitation conditions for identifying the coefficients of the function.

11. The method of claim 9, wherein the step (c1) further comprises the steps of:

determining update components for the coefficients so that an error between the indicated mean effective pressure calculated in the step (b) and an estimated indicated mean effective pressure estimated from the function converges to zero; and adding the update components to predetermined reference values to determine the coefficients, thereby causing the coefficients to converge to the reference values as the error converges to zero;

wherein the reference values are predetermined so that the control for controlling the set ignition timing to converge to the optimum ignition timing stops when the coefficients have converged to the reference values.

12. The method of claim 9, further comprising the step of:

applying a limit process to at least one of the coefficients so that it is prevented that the characteristic curve is estimated as a downward convex curve.

13. The method of claim 8, wherein the step (b) further comprises the steps of:

extracting an alternating component from the detected in-cylinder pressure; and calculating the indicated mean effective pressure based on the alternating component.

14. The method of claim 8, wherein the step (e) further comprises the step of:

using a response assignment control to control the set ignition timing, the response assignment control being capable of specifying a response characteristic of the set ignition timing to the optimum ignition timing.

* * * * *